Dec. 24, 1929.                K. F. J. KIRSTEN                 1,740,820
                          ENGINE DRIVEN MARINE VESSEL
                        Filed April 10, 1924        7 Sheets-Sheet 1

INVENTOR
Kurt F. J. Kirsten
BY
ATTORNEY

INVENTOR
Kurt F. J. Kirsten
BY
ATTORNEY

Dec. 24, 1929.  K. F. J. KIRSTEN  1,740,820
ENGINE DRIVEN MARINE VESSEL
Filed April 10, 1924   7 Sheets-Sheet 4

INVENTOR
Kurt F. J. Kirsten
BY
ATTORNEY

Dec. 24, 1929.  K. F. J. KIRSTEN  1,740,820
ENGINE DRIVEN MARINE VESSEL
Filed April 10, 1924   7 Sheets-Sheet 5

INVENTOR
Kurt F. J. Kirsten
BY
G. Wright Arnold.
ATTORNEY

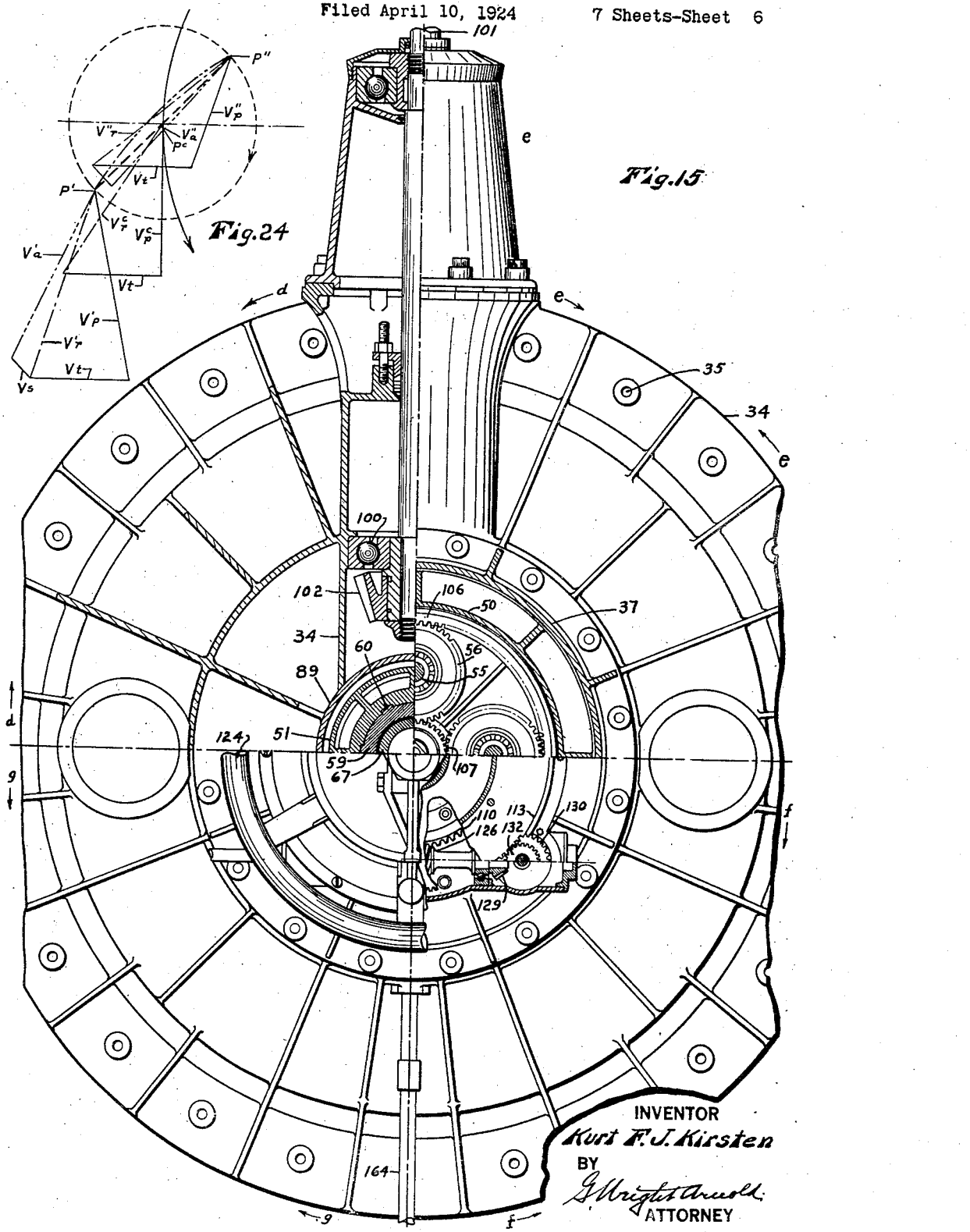

Dec. 24, 1929.　　　K. F. J. KIRSTEN　　　1,740,820
ENGINE DRIVEN MARINE VESSEL
Filed April 10, 1924　　7 Sheets-Sheet 7
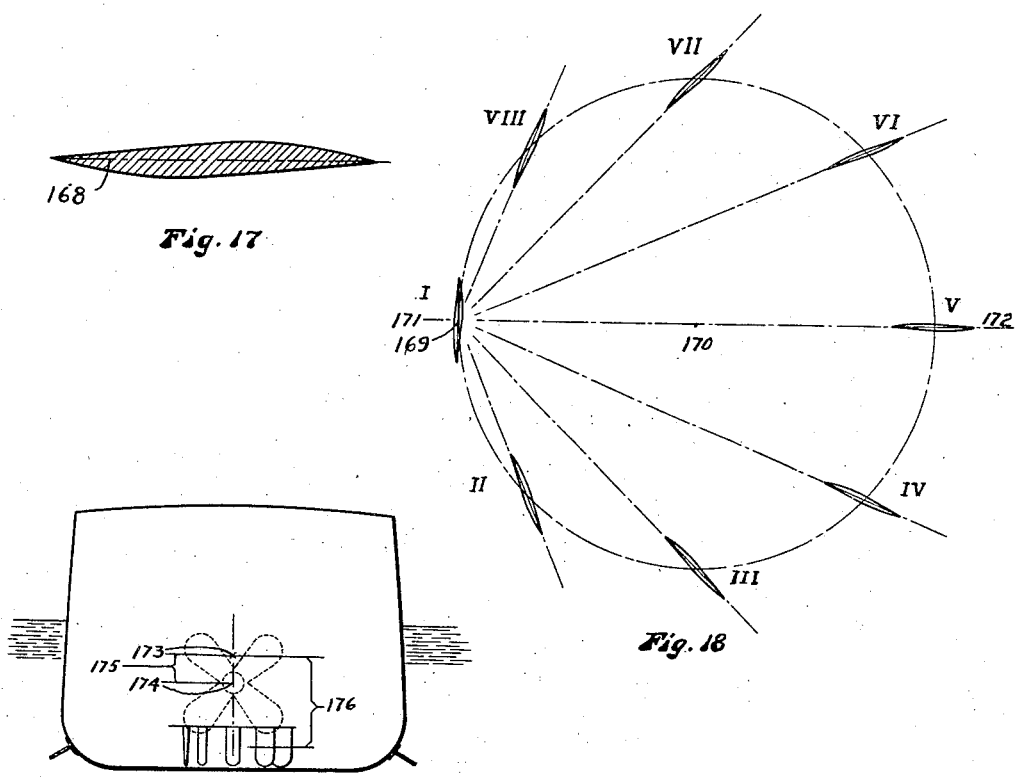
Fig. 17
Fig. 18
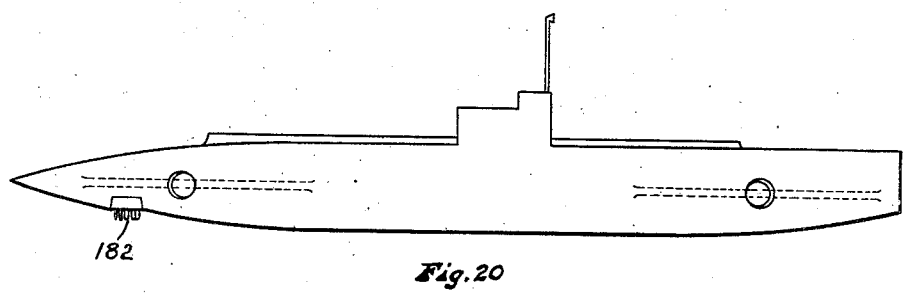
Fig. 19
Fig. 20
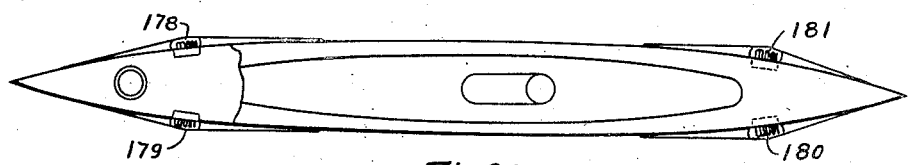
Fig. 21
INVENTOR
Kurt F. J. Kirsten
BY
ATTORNEY Patented Dec. 24, 1929

1,740,820

UNITED STATES PATENT OFFICE

KURT F. J. KIRSTEN, OF SEATTLE, WASHINGTON, ASSIGNOR TO THE KIRSTEN-BOEING ENGINEERING CO., OF SEATTLE, WASHINGTON, A CORPORATION OF WASHINGTON

ENGINE-DRIVEN MARINE VESSEL

Application filed April 10, 1924. Serial No. 705,504.

My invention relates to the art of engine driven marine vessels. More particularly, my invention pertains to a new, improved engine driven vessel which results from the joint and cooperative action of a new propeller and new design of hull.

The objections to the present type of screw propeller and the present design of hull reveal the interdependence of these two factors, the propeller and the design of the hull, and the limitations mutually imposed one upon the other, as well as the problems and conditions to be solved and satisfied by my invention.

The ordinary screw propeller, as employed almost universally in marine drives, has the following features which seem to be insurmountable difficulties in providing the efficient propulsion of ships or efficient power transfer such as is ordinarily obtained from present day industrial machinery.

It is well understood in marine engineering that the overall efficiency of a screw propeller installation is not ordinarily more than fifty-five percent (55%) and reaches a maximum of not more than sixty-five percent (65%) in the best installations, whereas industrial machinery used in hydraulic propulsion or in connection with electrical generators or motors is expected to operate at an efficiency exceeding ninety percent (90%).

The inherent defects of the screw propeller will appear in the following:

The function of a propeller is the acceleration of a fluid from one to another velocity, and is accomplished through the screw propeller by the interaction with a fluid medium of radially mounted blades rotating in a plane at right angles to the shaft, the blade cord being inclined to the plane of rotation at an angle which decreases from a maximum near the hub to a minimum at the tip. As the blades are rotating about the shaft, the fluid medium in which they operate is forced to flow along these inclined surfaces, and the resultant movement of the fluid takes place in the direction approximately at right angles to the plane of rotation of the blades. The thrust between any portion of the blade and the fluid medium varies in direct proportion to the square of the velocity of the relative movement between the blade and the fluid, and also in direct proportion in a geometrically similar propeller to the area of the blade in relative sliding contact with the fluid medium. Since the relative velocity between the blade and the fluid medium increases from the center of the shaft to the tip of the blade in direct proportion to the distance of any point on the blade from the center, the velocity varies and the maximum velocities are obtained at the tip of the blade, and hence the maximum pressure per unit area should be obtained at the tip of the blade. However, the blade of a propeller is a cantilever, rigidly attached to the hub of the propeller, and from the standpoint of structural rigidity, an increased load from the points of support of the cantilever to the extreme of projection of the blade constitutes uneconomical use of the structural sustaining qualities of the material used in the make-up of the cantilever. In order to overcome this difficulty, as well as others hereinafter set forth, the tip of the propeller is usually decreased in width. Therefore, the maximum thrust of the blade is, in actual practice, necessarily located near a point on the blade approximately two-thirds the length of the radius from the center of the propeller. The thrust near the hub becomes negligible by reason of the decrease in velocity between the propeller blade and the fluid. Said thrust is also rendered negligible by reason of the inefficient blade sections and the excessive pitch angle which ordinarily obtains at points near the hub. Finally, the hub, itself, cannot perform any function in providing for any thrust whatsoever.

The greatest mechanical losses, however, inherent in the action of the ordinary screw propeller are found to occur near the tips of the blades, when the velocities reach such a magnitude that the acceleration forces acting upon the fluid approach the pressure of one atmosphere, producing as a consequence the phenomenon of cavitation.

The principle of operation of a screw propeller requires it to be mounted at the rear end of the ship and the screw propeller is operated by a horizontally directed shaft protruding from the hull. The engines used in rotating the propeller are located, in general, for balancing reasons, amidship. Hence, the shaft must pass through practically half the length of the hull and ordinarily is housed in a watertight tunnel of considerable dimensions for accessibility for oiling and repairs, which tunnel, constituting dead space, considerably reduces the available cargo capacity, besides being, as respects its construction, an item of expense in itself. The great separation of the engine and the propeller, as just indicated, creates the serious problem of the proper lining-up of the propelling machinery with the propeller journal. This is a problem of great refinement, since a very high degree of accuracy is requisite to insure efficient and proper running of the shaft and associated driving mechanism.

It is well recognized, for a body to be moved through a fluid medium with a minimum effort, the form of the body should have "easy" or "fine" stream lines. This fundamental law is strictly observed in the present designing of ship hulls in all its parts so far as the proper operation of the screw type of propeller will permit, but, unfortunately, the principle of operation of the screw propeller prescribes the sacrificing of the best or fine stream lines in the stern portion, and the providing of a relative abrupt curving in of the lines is necessary to afford "clear water" at the propeller. The fluid medium must be admitted to the propeller from a free channel, and should also be emitted from it into a free channel to avoid the presence of eddying currents in the propeller, which disturbances greatly decrease the efficiency of the propeller. Hence, the proper operation of the screw type of propeller positively interferes with designing the hull for easy stream lines, so that it will have maximum displacement for its length. That is, the designing of the stern lines, particularly of the under water part of a ship, according to general present practice, is not with sole reference to producing a minimum of hull resistance, but said designing for minimum hull resistance must be sacrificed for the providing of efficient locations for the screw propellers and rudders.

This abrupt curving in of the stern lines of the underbody portion and the extensive overhang of the stern portion to provide a mounting means for the rudder and its parts, as well as proper tiller operating space, adds greatly to the length of the ship without a proportionate increase in cargo space, i. e., the stern portion, for the most part, in hulls of present practice design may properly be styled "waste length", so far as furnishing cargo space is concerned. In this connection, a primary object of my invention is to provide an engine driven marine vessel, having a hull which is characterized, (a), by a gain in absolute length as compared to present practice hulls,—i. e., a hull which may be said to have no "waste length" portion, and (b), by a gain in refined stream lines.

There is also interference in the proper operation and designing of the hull by the propeller in the following respect: The operation of the propeller causes a "wake", which obliges the hull to travel on lines different from the load water line at a standstill. The design lines of a ship hull are calculated for the vessel disposed on an even keel. But when a velocity of full speed ahead is attained, the discharging of the water by the screw type of propeller is such that the hull sinks, as it were, into the hollow resulting in large measure from the displacing of the water. Since the curving in is very sharp at the stern to allow for clear water to the propeller, this stern part develops little buoyant force, and, hence, the settling into the hollow resulting from the throwing away of the water is increased by the shape of the hull, which shape in turn is dictated in its design by the screw type of propeller. As the stern thus is caused to settle, the bow rises to compensate, and as the degree of settling depends largely upon the load being carried and the speed, it is manifest that no stream line can be provided to satisfy all conditions of use which may be ordinarily met. This is a consequence in large measure,—be it noted, not altogether,— of the "waste length" portion of the hull. This suggests the importance of a propeller which will cooperate with the hull in such a manner as to permit of the hull being designed to operate more nearly in one plane only, i. e., so that the trim or relative positions of the bow and stern will not be as greatly disturbed, (as heretofore), by the operation of the propeller, and so that the design of the hull may be provided with easier or finer stream lines both fore and aft than heretofore. Be it particularly noted that any change in trim materially increases the hull resistance, which must be studiously kept to a minimum.

Furthermore, the following condition of interaction between hull and propeller is a situation which has caused many accidents due to the inherent loss of control of the vessel. The ordinary screw type of propeller projects from the water in practically all cases of installation when the ship is under ballast, and when moving under those conditions under her own power, the propeller tortional thrust is unbalanced, so that a side thrust upon the rear end of the ship is the result. This side thrust must be compensated for by the rudder, so that the steering under ballast is entirely different from the steering when the propeller is completely immersed. This developing of two types of steering is manifestly objectionable and results in imperfect control, which is productive of accidents. My invention overcomes this difficulty by providing one type of steering.

Another serious objection to the designing of the stern with an abrupt curving in as above described is that the cargo-carrying space is greatly reduced. If the hull lines in the stern portion for a given maximum hull length could be carried out to the easy stream line form, a material increase of the hull cargo capacity could be secured. However, the sharp curving in of the hull stern lines is imperative with the screw type of propeller located, as it necessarily is, in the stern end portion, in order to have the water led to the blades after displacement by the hull amidships in as nearly a clear free stream as possible. However, despite the sacrifice of stream line design, "clear water", or a free stream to the propeller, is not secured in the present design. Obstructions of serious moment exist both fore and aft of the propeller. The median beam, constituting the joining line of the two sides of the hull, forms an obstruction immediately in front of the propeller which removes the fluid stream in a vertical line through the propeller. The blades in passing through this portion of their orbit engage a water medium of a velocity differing greatly from that in the rest of its path. This sets up vibrations in the propeller and its associated mechanisms as well as reduces its efficiency. As before noted, the screw propeller hub constitutes an obstruction pure and simple and forms no part of the hull and develops no propulsion force whatever. Also, there are the obstructions astern of the propeller, since the screw type of propeller generally involves the employment of a rudder for steering purposes. In this connection, there are the fixed rudder post and the broad surfaces of the rudder. The rudder is usually located directly astern of the propeller in the slipstream of the propeller, where the velocities are the greatest,—a location which is imperative for its efficient or even practical operation. The rudder surface interferes with the movement of the vessel to a far greater extent than ordinary hull surfaces for the reason that it is immersed in a fluid which moves faster than the fluid in contact with the hull. The resistance of the rudder under ordinary operating conditions constitutes a very high percentage of the hull resistance. In other words, the fluid is drawn into the propeller, flowing around a series of obstacles, and is again ejected from the propeller against a series of obstacles, so that a great deal of energy is wasted between the ship and the fluid.

The rudder type of steering device is also exposed to be shot away in naval engagements, and the long driving shaft extending from the engines to the propeller mountings is a weak feature in war-craft, as a severe explosion shock destroys, or seriously impairs, the operativeness of the propeller. The vertical disposition of the shaft in a plane at right angles to the longitudinal axis of the vessel of the present invention permits the concentration and compactness of the propulsion mechanism, and, therefore, not only eliminates danger due to the shaft presenting a long target, but the concentration permits of better armor protection.

Moreover, the actuating machinery which transmits the power from the engine to the propeller must be designed particularly heavy, since, in order to reverse the direction of the propulsion force, the direction of the motion of said machinery must be reversed. Such actuating machinery must be capable of absorbing the stresses and kinetic energy in bringing the propeller and associated mechanism to a standstill and then starting and accelerating forthwith in the opposite direction. This great weight, besides being highly objectionable in itself, as a matter of dead load, involves a great loss of time in maneuvering the ship,—often just the vital time required to avoid a collision with an unexpected obstacle, as occurs in a fog. More specifically, for general illustration, an installation employing fourteen hundred (1400) horsepower utilizes a propeller of the screw type of approved standard design weighing eleven thousand (11,000) pounds. To operate this propeller a shaft of approved standard design weighing twenty thousand (20,000) pounds is employed, and the rudder and associated mountings and parts, weighing an additional thirty thousand (30,000) pounds, is employed, making a total of about sixty-one thousand (61,000) pounds. Moreover, to this figure must be added the weight of a reversing engine or reversing mechanism, and also the weight of the bilge keels; whereas, in contrast to these figures, a design of a propeller of proven design embodying my invention to employ fourteen hundred (1,400) horsepower would weigh about ten thousand (10,000) pounds. This includes the steering mechanism as well, since no separate guiding means in the form of a rudder is necessary with my invention. The saving and efficiency of the propeller embodying my invention is very marked in that it does away with the weight and cost of a large part of the usual propeller shafts, the struts, the rudder, the shaft boss, the propeller hub, the reversing engine and bilge keels.

Again, the maneuverability of the vessel involving a separation of the steering and driving mechanism is fraught with serious disadvantages. This difficulty is augmented in that the operator on the bridge, according to the prevailing and accepted practice, does not have under his immediate control both of said agencies, but rather must signal to the engine room his orders to regulate the magnitude of the propeller thrust, and in any event, the two elements, the steering and driving mechanism, remain separate.

Furthermore, not only does the mode of operation of the screw propeller necessitate its objectionable location as respects the hull and the features above noted, but it results in the positioning of the propeller in a place which is inaccessible for repairs or replacement at sea, while between ports. A vessel disabled as respects its propeller of common design must signal for help and be salvaged, and upon reaching port it must be drydocked while being repaired, which entails great expense, both for actual repairing and loss of operating time.

In the case of a turbulent sea, the stern of the vessel together with the propeller may be lifted clear of the water with the result that tremendous breaking and displacing stresses incident to racing the machinery are placed upon the engines and associated mechanism with the instantaneous removal of the water medium as the means against which the powerful marine engines exert their thrust. This is true for both the reciprocating and turbine type of engine. When the prime mover is a reciprocating type of engine, the sudden removal of the load from the driving mechanism results in such a sudden increase in the speed of the driving mechanism that there is a loosening of the mountings, if not more serious consequences. The sudden return of the propeller to the submerged position in the sea likewise is attended with stresses which approach, if not reach, the breaking point. With the turbine type of engine, the danger is not so great upon the removal of the load on the propeller since the mode of operation of this type of engine permits it to accommodate itself readily to the higher speed which results, but the same danger, as in the case of the reciprocating engine, is developed when the load is suddenly placed upon the driving mechanism, when the propeller returns to the submerged position. So great are the dangers set forth in this connection that the practice is for an operator to stand by the throttle constantly and cut off the power periodically as the propeller is lifted from the water.

The revolving of the screw propeller in a plane at right angles to the longitudinal axis of the vessel manifestly tends to augment, rather than minimize, the rolling of the vessel due to any waves, so that in this respect also there is a failure of cooperation between the propeller and the hull in stabilizing the latter. The axis of the screw propeller is so nearly disposed to, if not coinciding with, the longitudinal axis of the vessel, that the same is disposed at a serious disadvantage to oppose the rolling of the vessel, even if its mode of operation were of such character as to enable it to so function. A primary object of my invention is to provide a marine engine driven vessel having a propeller disposed in spaced relation to the longitudinal axis of the vessel, said spaced relation being equal at least to the distance from the said axis to the hull wall at the point where said propeller is located, or said spaced relation is of such proportion as to permit the creating of a substantial steadying effect to the hull. Moreover, a primary object is to eliminate the use of bilge keels in providing this steadiness or freedom from rolling action of the hull.

It is well known that the motion of a vessel in a fluid medium is resisted by the viscous drag created by the viscosity of the medium. The fluid particles tend to adhere to the surface of the vessel and are continually rubbed off and replaced by the inflowing fluid. The viscosity of the fluid, being a measure of the shearing force required to create relative motion of the fluid particles, causes these particles to follow the motion of the vessel, this tendency increasing with the nearness of the particles to the surface of the vessel. Consequently the relative motion between the vessel and the medium increases from zero at the surface to the maximum at some distance from the hull. This gives rise to what is known as the "boundary layer" phenomenon or "velocity gradient" near the vessel's surface. The fluid medium may be thus thought to consist of strata of different velocity in the close vicinity of the hull. These strata are practically parallel to the hull surface. A single screw propeller located behind the stern post or twin propellers placed on each side of the hull must have their blades pass through strata of different velocity. The blade tips of the single screw, therefore, cut a stratum of practically zero velocity when passing the stern post and then move into strata of higher relative velocity after passing the stern post, cutting through the stratum of maximum velocity when the blade is in a horizontal position. Thus, for every revolution the blade tip passes twice through zero velocity and twice through maximum velocity strata of the medium. Consequently the effective slip and with it the thrust and torque upon the blade vary from a maximum to a minimum, relatively, twice per revolution giving rise to serious vibration.

The twin-screw blades approach with their tips the boundary layer only once per revolution, but the same tendency exists for vibration as for the single screw with the exception that the vibration frequency per blade is one-half of that for the single screw.

Aside from the dangers inherent in vibration to the enduring structural strength of metals, the increase in effective slip at the blade tip when approaching the boundary layer also shifts the load upon the centilever blade nearer to the tip so that the blade must be designed for greater strength. Furthermore, the hull of the vessel must be strengthened to sustain the vibrations of the screw.

A primary object of my invention is the elimination of all vibrations, which is accomplished by the fact that the propeller is coordinated with the hull so that a given part of every blade always moves in the same velocity stratum whether the installation be of the single or twin type.

After thinking out as an original conception a type of propeller which would meet the difficulties detailed in all the preceding paragraphs, and which would constitute a harmonious unit of the propeller and hull, said parts having each peculiarities of form and relation one to the other, there still remained the difficulties and problems pertaining to the mechanical embodiment of such a propeller. The type of propeller referred to and achieving the indicated object of unifying the action of the propeller and the hull is the type of propeller embodying blades which rotate on their own axes, while revolving in an orbit about a common axis. This type is fully described and analyzed in the specification of United States Letters Patent issued to me for a propeller, Number 1,432,700, dated October 17, 1922. In embodying my invention in mechanical form for marine installation, one chief problem and important condition which had to be met, or was most highly desirable, was that the parts should be accessible from the inside of the vessel for repair or replacement, so that the same might be done at sea and necessity of drydocking be eliminated. In providing such an embodiment of my invention, obviously, there are parts that are less readily accessible than others. These parts must be so disposed that they will be subject to a minimum of wear, that is, the gear pressure should be reduced to a minimum. A condition that must be considered in this connection is that the lowermost parts in the more simple and practical design are exposed to water, and this may be the particularly actively corroding salt water of the sea, so that refined mechanical means, capable of great stresses, are not readily available. The discovery of the arrangement of the parts which would permit of the reduction between the master gear and the gears on the blades to a one/two (1:2) relation in part solved this problem, as attested by the fact that the life of the gears so exposed is greater than the life of other parts.

A further condition to be met was that of making the moving parts as nearly self-contained as possible, and so disposing the elements of the propeller that their operation would create pressures that would support the weight of the propeller and thereby reduce the wear on the parts.

A fundamental objection which obtains to propellers of the type embodying my invention is that the stresses due to the eccentric pressure on the blade are of such magnitude that the timing and control mechanism of the blades is ordinarily accomplished only by using excessive forces in the said timing and control mechanism. This of course creates and complicates the condition for providing for minimum wear in the parts. It is evident that the control mechanism should absorb as little power as possible for the sake of the maximum over-all efficiency of the device, and also for securing the control mechanism against wear. It may be stated as a fundamental requisite of a propeller of the type of my invention that to make the same at all practically operative all objectionable stresses on the timing and control mechanism must be eliminated. Otherwise, as learned through experience and extensive tests, the excessive stresses create a torque in the control mechanism and deflect the same enough to destroy the proper alignment of the blades, thereby introducing a pulsating thrust upon the fluid stream which imparts most severe and violent vibrations to the hull of the vessel. Thus, the importance of the relation of blade width to the orbital diameter, which relationship is responsible for the eccentricity of the blade, is manifest in the form of a new requisite. This importance of the relation of blade width to the orbital diameter for the elimination of excessive stresses on the timing and control mechanism is, be it noted, in addition to the requirement of proper blade ratio for the best or practical operation of a propeller of this type, as more fully set forth in my previous Letters Patent above named.

In all these highly objectionable features, the inter-dependence and cooperativeness of the propeller and the hull is apparent. In general, the objects of my invention, in addition to those noted, are to provide a marine vessel embodying a cooperating hull and propeller as a working unit which overcomes each and all of such objections. A primary object of my invention is to provide a marine vessel embodying a hull designed to cooperate with a propeller, which propeller in and of itself forms a part of the hull wall, and which propeller will yield a substantially equal or higher efficiency than the present screw type of propeller. A primary object of my invention is to provide a marine engine driven vessel having a hull wall with an opening and a propeller mounted therein, the rim of said opening lying in the same plane. A primary object is to provide in combination with a marine vessel a propeller in which the phenomenon of cavitation is eliminated, and one whose blades bear a uniform load throughout its length from the point of cantilever support to the extreme point of overhang. Another primary object is to provide a marine propeller having blades of practically uniform width throughout their length. Again, a primary object of my invention is to provide a marine engine driven vessel altogether free of shafts longitudinally disposed or free of long shafts so disposed,—it being my purpose to provide such a vessel having the propeller shafts disposed at, or approximately at, right angles to the longitudinal axis of the vessel, thereby providing for compactness, and facilitating the protecting thereof in naval vessels. A further primary object of my invention is to provide a marine engine driven vessel whose design embodies easy or fine stream lines fully throughout the entire length from stem to stern, so that, together with other advantages, the cargo carrying space for a given length of vessel is enlarged. A primary purpose of my invention is to provide a marine engine driven vessel which will effect a great saving in power due to the elimination of practically all appendage resistances due to rudder and propeller and the possibility of designing the stern lines of the under water body of the ship with reference in the main only to the minimum hull resistance through the removal of the necessity of providing for efficient locations of the screw propeller and rudder. Moreover, a primary purpose of my invention is to provide a marine engine driven vessel which has no separate steering water engaging mechanism in the form of the ordinary rudder, thus eliminating all the rudder appendages and high cost of the difficult construction of the stern portion of a vessel, and, as respects the operation of the vessel, the rudder resistance representing a large percentage of the hull resistance is eliminated.

Further, it is a primary object of my invention to provide a marine propeller, no part of which, except the blades, i. e., the actual water engaging portions, projects into the water. Also, it is a primary purpose of my invention to provide a marine vessel with a propeller mounted on the bottom of, and sufficiently aft of, the midship section to provide for steering, so that it is preferably for ordinary commercial vessels at all times wholly under water, and the danger incident to racing the machinery in a turbulent sea is eliminated. A still further primary object is to provide a marine vessel with a propeller to and from which the water may pass free of obstacles. Again, a primary object is to provide a marine vessel having a propeller and actuating mechanism which may operate at all times in one direction, so that a reversal of direction of the vessel does not involve a reversal in the direction of the driving mechanism. A primary object of my invention is to provide a marine vessel with a propeller, whose elements are of such form and disposition that they are readily accessible, so that any one or all of its blades or other elements may be removed and repaired, or others substituted, or an even distribution made of the blades unimpaired at sea between ports, so that at once both the propelling force and the steering mechanism is rendered replaceable, and protection is insured against the usual losses and danger incident thereto, and all such may be provided without the necessity of drydocking and the loss of operating time when port is reached.

A primary object of my invention is to provide a marine propeller embodying a plurality of blades which rotate on their own axes while revolving in an orbit about the axis of said propeller, said propeller being characterized by its minimum of wear for the bearings, its compactness, its lightness of weight per horsepower employed, and by its stabilizing the vessel against wave action,— the ratio of the width of said blades to the diameter of the orbit being of such degree of smallness that the angle of incidence formed by said blades with the direction of their movement through the fluid medium will be wholly upon one side of each blade throughout its orbital revolution. Further, in providing such a type of propeller, primary purposes of my invention are: To provide a roller bearing in the form of a retaining ring for the blades, which ring will sustain the centrifugal force and otherwise relieve the blade bearings from severe pressures; To provide a propeller having the rotor parts pendently mounted, which suspension mounting permits the supporting of the propeller by the pressures developed by the operation of the propeller; To provide a blade timing and control mechanism, including a master gear which may be caused to engage such number of blade gears as may be desired, said master gear being readily accessible from inside the vessel, which mechanism holds the said blades securely in proper alignment, so that all objectionable vibration to the hull of the vessel therefrom is eliminated; and, To provide such a propeller as specified having its main bearing, which transmits the thrust of the propeller, disposed in the plane of the hull wall, whereby among other advantages the long driving shaft, together with its numerous bearings, is eliminated.

The above mentioned general objects of my invention, together with others inherent in the same, are attained by the mechanism described below and illustrated in the following drawings, the same being merely preferred exemplary forms of embodiment of my invention, throughout which drawings like reference numerals indicate like parts:

Fig. 15 is a view in cross section at four elevations of Fig. 7 as marked $d, d$; $e, e$; and $f, f$; with a part broken away to show the control worm and associated parts, and top view $g, g$;

Fig. 17 is a view in cross section of a modified form of a propeller blade embodying my invention, the same being conversely symmetrical;

Fig. 18 is a diagrammatic view illustrating the positioning of the blades to provide mechanical symmetry;

Fig. 19 is a diagrammatic view of the stern of the hull of a vessel, showing the relative difference in position of a screw propeller and a propeller embodying my invention, with respect to the center of mass of the vessel;

Fig. 20 is a diagrammatic view in side elevation of a submarine form of a vessel showing the disposition of the propeller embodying my invention;

Fig. 21 is a plan view of said submarine form of a vessel embodying my invention;

Figure 23:
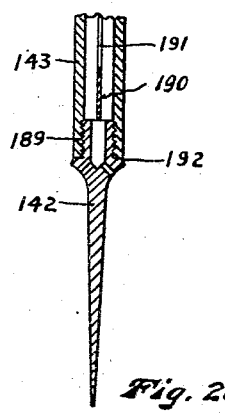

Fig. 23 is a fragmentary view in section of a modified form of blade embodying my invention; and Fig. 24 is a diagrammatic view representing graphically the difference in velocities of the extremities of a blade in position III, the width of said blade being of a greater ratio than two-tenths (.20) to the orbital diameter, when the peripheral velocity of the axis of said blade is greater by fifty percent (50%) than its translational velocity, i. e., its velocity through the fluid medium.

Figure 7:
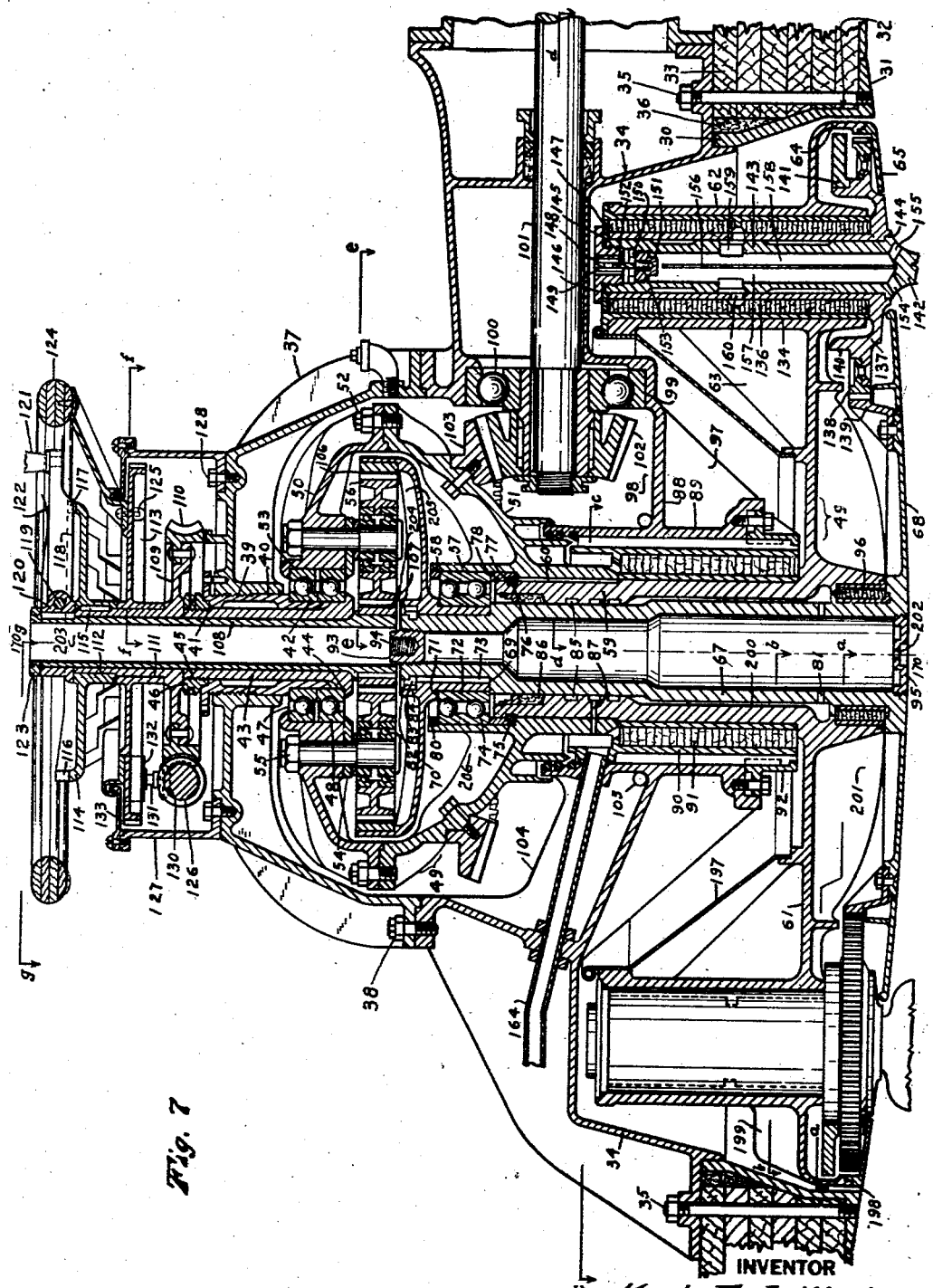
Fig. 7 is a view in vertical section of the said propeller along the longitudinal axis of the vessel.
Figure 9:
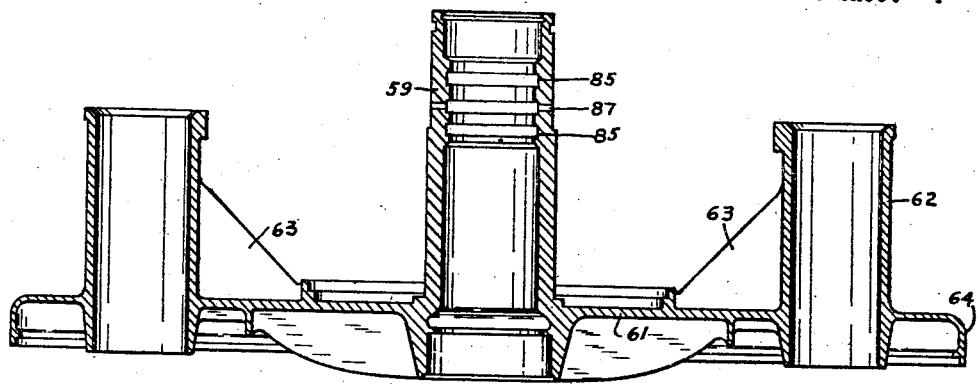
Fig. 9 is a view in vertical section of the bottom portion of the propeller rotor.

A ring, Fig. 7, or casing 30 with rim 31 is mounted in an opening 32 in the hull wall 33. To this casing a propeller housing 34, preferably bell-shaped, is secured by bolts 35. This arrangement of the parts provides for making secure the packing or calking 36. Obviously, the said ring 30 may be integral in a steel hull with the housing 34, since it constitutes in effect a part thereof. This housing 34 is preferably provided with a demountable cover 37 mounted on the main housing 34 by bolts 38. By removing the cover 37 access to the internal mechanism of the propeller may be had, as described hereinafter. The cover 37 is provided with an axially disposed threaded opening 39, in which an adjusting sleeve 40 is disposed, having in its top portion a shoulder 41 and in its lower portion an annular bearing seat 42. Within this sleeve a supporting sleeve 43 is disposed having a bearing seat 44 in its lower part and having threads 45 in its upper part to receive a lock nut 46. In these bearing seats 42 and 44, ball bearings 47 and 48 are preferably disposed at right angles to the axis of said sleeves.

Figure 14:
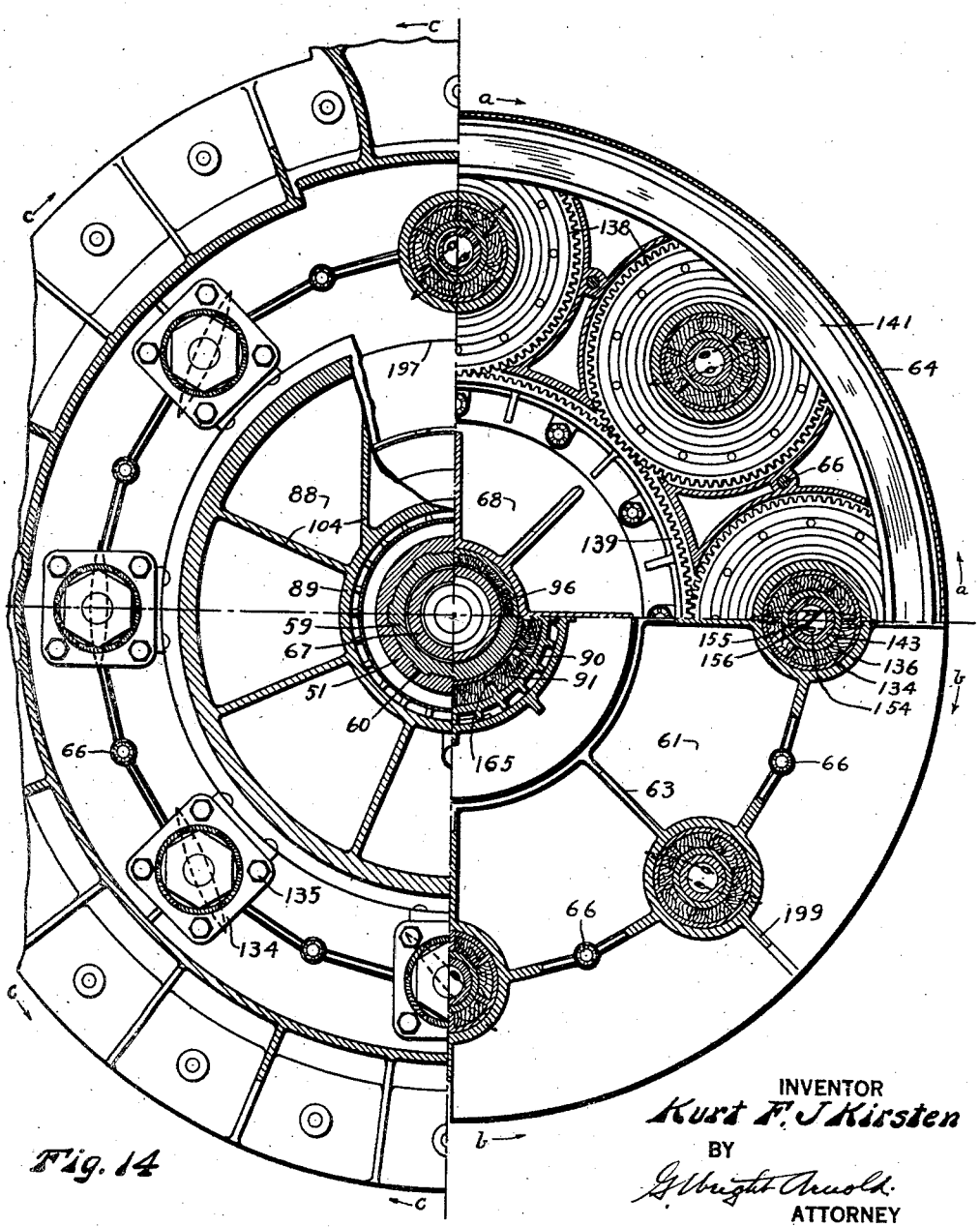
Fig. 14 is a view in cross section at three elevations of Fig. 7 as marked $a, a$; $b, b$; and $c, c$.

The ball bearings 47 and 48 serve as the upper mounting for a rotor 49. This rotor consists of several parts as follows: A rotor cover 50 is secured to a rotor drive member 51 by means of bolts 52. The cover 50 is provided with a bearing seat 53 to receive the ball bearings 47 and 48, which ball bearings are further held in place by means of the clamping ring 54 supported by planetary gear pins 55, which serve to mount planetary gears 56 on said cover 50,—there being altogether four such planetary gears disposed ninety degrees (90°) apart. The rotor drive member 51 is provided with a bearing seat 57 and threads 58. This rotor drive member 51 is mounted upon an axially disposed rotor mounting shaft 59 and connected thereto by means of keys or splines 60. This shaft 59 is integrally formed with a web member 61, which bears in its peripheral portion blade mounting housings 62. The rotor web member 61 and blade mounting housings 62 are provided with reinforcing ribs 63. The peripheral portion of the web member 61 is provided with a flange 64, abutting against which is the bottom cover 65, held to the web 61 by bolts 66, (see Fig. 14). The rotor shaft 59 has axially disposed therein the hollow shaft 67 of the master gear spider 68, said shaft 67 having a shoulder 69, on which is mounted the internal timing gear spider 70, which spider has a shoulder 71 and a bearing seat 72. Said internal timing gear spider 70 may be secured by splines or keys 73 to the master gear shaft 67. Preferably mounted on bearing seat 72 against said shoulder 71 and also on the shoulder 69 is ball bearing 74, which with respect to its outer periphery is mounted on the bearing seat 57 of the rotor drive member 51. A segmental lock ring 75 may be disposed in a recess 76 of the rotor mounting shaft 59, and said lock ring 75 may be disposed also to engage a shoulder 77 of lock ring 78, which in turn may be mounted on bearing seat 57 of the rotor drive member 51. The ball bearing 74 may rest upon this lock ring 78 and may be held in position thereon by means of lock ring 80 engaging the threads 58 of the rotor drive member 51. Lock rings 82, 83 and 84 serve to secure the internal timing gear spider 70 upon the shoulder 69 of the master gear hollow shaft 67. The rotor shaft 59 is provided with water-retarding grooves 85, and a packing 86 is suitably maintained in position between said master gear shaft 67 and said rotor shaft 59, which shaft together with the mounting part of the rotor drive member 51 has water passageway 87. The propeller housing 34 has a transversely disposed wall 88 which has an axially disposed sleeve 89, which serves as a mounting for the lignum vitæ bearing sleeve 90, which holds the lignum vitæ blocks 91 which constitute the main and thrust bearing for the rotor 49. A main and thrust bearing retainer 92 is illustrated; however, this may be removed, and instead of the lignum vitæ bearing, a ball bearing of non-corroding metal (not shown) may be disposed as an equivalent therefor, as the particular sleeve 90 illustrated is designed for either type of bearing. The master gear shaft 67 is provided with a nut 93 having a threaded recess 94 therein, said recess being adapted to receive a rod (not shown), which may be screwed therein, said rod of ordinary well known type having an eye to which a line may be made fast, and serve as a holding means for supporting said master gear parts while the same are being installed or removed for repair. In the opposite end of said master gear shaft 67, a nut 95 is preferably provided to restrict the admission of water to said hollow shaft.

The rotor shaft 59 is also provided with a lignum vitæ bearing 96 for the master gear spider 68. Port 81 in sleeve 67 admits water to bearing 96. Thus, is constructed the rotor member, together with parts of the timing and control mechanism directly associated therewith.

The wall 88 provides the two chambers 97 and 98 disposed one above the other. The wall 88 may form a bearing seat 99 for ball bearing 100, which in turn forms a mounting for the end portion of a driving shaft 101 to which is keyed the drive pinion 102, which engages the gear 103 operatively disposed on the rotor drive member 51. The chamber 98 may be supplied with lubricant for the ball bearing 100 of the pinion 102 and gear 103. Reinforcing ribs 104 extend into this compartment and in the base of these ribs holes 105 permit the lubricant to flow from one compartment to another.

The timing and control mechanism, besides said master gear shaft 67 and spider 68, is formed as follows: Planetary gears 56, four in number as illustrated herein, engage on their outer periphery the gear 106 of the internal gear spider 70, and said gears 56 engage on their inner periphery the gear 107 on one extremity of the timing and control shaft 108, preferably hollow, which shaft is rotatively mounted as respects the supporting sleeve 43. A worm gear spider 109, having worm gear 110, is rotatively mounted on shaft 108. The said worm spider 109 has bearings 111 and 112. On bearing 111 is rotatively mounted spur gear 113, while on bearing 112, is secured a reversing gear disk 114 by splines 115. Said disk 114 has notches 116 and 117, disposed 180° apart, for receiving the reversing gear latch 118, which is pivotally mounted on pivot 119 to reversing gear hub 120 splinedly mounted on shaft 108. The reversing gear disk 114, together with the latch 118, forms a holding means for the shaft 108. Said reversing gear latch 118 is provided with a handle 121 and is releasably maintained in the notches 116 or 117 by means of latch spring 122. A shaft nut 123 holds said hub 120 securely upon the shaft 108. A steering wheel rim 124 may be mounted upon the spur gear 113 by means of screws 125.

Figure 13:
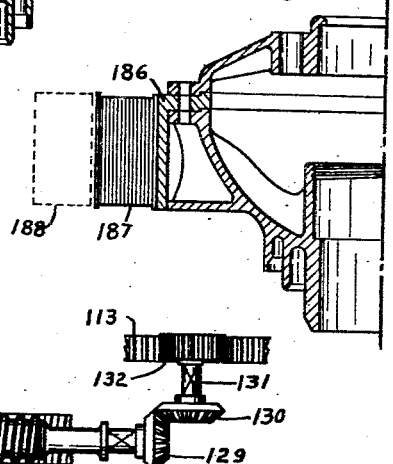
Fig. 13 is a view in elevation of the control worm.

The worm 126 is disposed to engage the worm gear 110. The worm 126 is in turn mounted in a worm gear housing 127 secured to the propeller housing cover 37 by means of screws 128. On the end of this worm 126 a mitre gear 129 (see Fig. 13) is mounted, which engages mitre gear 130 mounted on shaft 131, which shaft bears on its inboard end a gear 132, which in turn engages the spur gear 113. The worm gear housing 127 is provided with a worm gear housing cover 133.

The propeller blade mounting is formed as follows: In each blade mounting housing 62 is disposed a blade bearing 134 held to said cylinder by screws 135. (See Fig. 14.) The blade bearing is provided with lignum-vitæ blocks 136 with respect to which a blade spindle 137 is rotatively mounted, said spindle having a blade gear 138 mounted thereon for engaging the master gear 139 carried by master gear spider 68. Also, but not necessarily, there may be provided a retaining ring bearing 140 for engagement with a retaining ring 141.

Figures 11, 12:
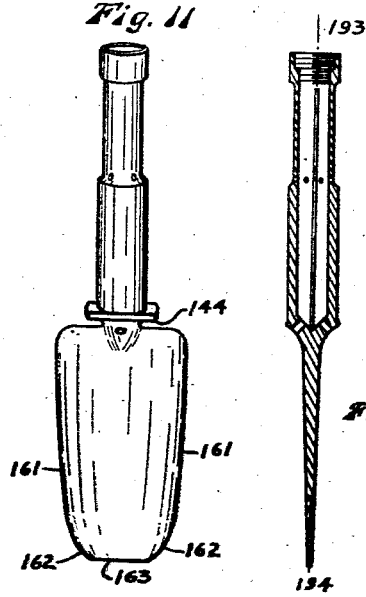
Fig. 11 is a view in perspective of a propeller blade embodying my invention.
Fig. 12 is a view in longitudinal section of said blade.

The propeller blade 142 is provided with a shaft 143, preferably hollow. Said shaft is adapted to make a tight fit within the spindle 137. Said shaft 143 is provided with two straight parallel sides 144, (see Figs. 7 and 11), which maintain said blade 142 against rotation in said spindle 137. The top portion of shaft 143 is provided with threads 145 to receive a blade nut 146, which is preferably caused to bear upon a bearing washer 147. The blade nut 146 has an axial opening 148 having axially disposed grooves 149, some one of which will register with grooves 150 in a nut 151, whose threads are oppositely directed to those of nut 146, so that a key 152 may serve to lock both nuts. Also in said nut 151 is provided a threaded recess 153 therein, into which hole a rod (not shown) may be screwed to hold said blade while installing or removing the same from its mounting. The blade is provided with two oppositely disposed ports 154 and 155, which lead to the interior of the hollow shaft 143. This interior has a longitudinally disposed partition or vane 156, dividing said interior into two chambers 157 and 158. Intermediate the ends of said shaft may be disposed water passage ways 159, which register with a like passageway 160 in the blade spindle 137. The blades may be formed with converging lateral edges 161, which may taper sharply at the end portions 162 and may terminate in the square end 163. (See Fig. 11.)

A pipe 164 is provided to introduce water as a lubricant to the lignum-vitæ blocks 91, which have the recesses 165 (see Fig. 14) therebetween.

Figure 16:
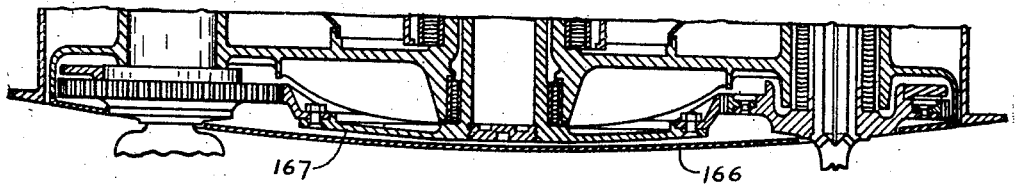
Fig. 16 is a fragmentary view in section of a modified form of the bottom portion of a propeller embodying my invention, showing cover extending entirely across the rotor member.

In the modified form of my invention shown in Fig. 16, the cover plate 166 extends entirely across the diameter of the opening, having peripheral clearance to permit rotation of the same and ejection of the water which may enter within the lines of the cover when the propeller is not operating. This cover is mounted on the rotor similarly to cover 65. Having the bottom of the propeller one continuous plate in this wise reduces the hull friction of this portion to a minimum, so far as having openings is concerned. A separate master gear spider 167 must be provided with this modified form of cover plate since the rates of rotation of the two are different.

In the modified form of blade shown in Fig. 17, the faces are conversely symmetrical with respect to the blade cord 168, that is the line joining the two edges of the blade.

In the diagrammatic view Fig. 18, the blades are illustrated with their blade cords 168 trained upon a common point 169, (here illustrated as axis of blade in position I), in the orbit described by the axes of the blades while collectively moving about the common axis 170 represented as a point in said drawing. The line 171, 172 represents the axis of symmetry of the propeller, that is, the line with respect to which the blade cords 168 form equal angles. The blades successively occupy the same positions and for purposes of illustration in said Fig. 18, eight positions are chosen, one for each blade, and said positions are designated by roman numerals I–VIII, inclusive.

In the diagrammatic sketch Fig. 19, it will be noted that the center of mass 173, as respects the axis 174 of the screw propeller, is disposed only a short distance, represented by line 175, above. Since the plane of rotation of the screw propeller is parallel to the plane in which the boat rolls, obviously the operation of the propeller cannot lessen the rolling action of the waves, but rather augments the same. Manifestly, even if the operation of the screw propeller was of a character to oppose the rolling action, its possible usefulness in this respect would be small, owing to the shortness of the lever arm represented by the line 175.

In contrast to this relation of the screw propeller to the hull is the relation established by the propeller and hull constituting the present invention. It will be noted that the plane of rotation of the propeller herein described is at right angles to the plane of rolling of the vessel, so that the forces developed by its operation oppose those tending to make the vessel roll, and be it particularly noted, that the locating of the propeller in the bottom of the vessel provides the long lever arm 176 through which these forces of the propeller may act. It has been found that the vessel of the present invention is very steady and free from rolling to a remarkable degree, positively resisting rolling while underway. The explanation of this is thought to be that the propeller creates a stream through the same and the dynamic action of the blades with respect to the stream operates to make the blades hold to the stream and strongly oppose displacement from the same, so that actual experience has taught that the operation of the vessel is characterized by an exceptionally high degree of steadiness. On account of this co-operation between the hull and the propeller in the vessel embodying my invention, the ordinary bilge keels may be omitted and thereby save the construction cost of the same and effect a substantial saving in operation by reducing the hull friction incident thereto.

In the submarine installation shown in Figs. 20 and 21, the propellers 178, 179, 180 and 181, constituting a part of the present invention, are disposed in the vertical or near vertical portions of the hull wall, so that their thrust may be utilized in submerging and raising the vessel as well as propulsion, while the propeller 182 identical in construction to those on the sides may be employed to steer the vessel in a horizontal plane as well as propulsion. Thus, is illustrated different planes in which the propeller constituting a part of the present invention may be installed.

Figures 10, 22:
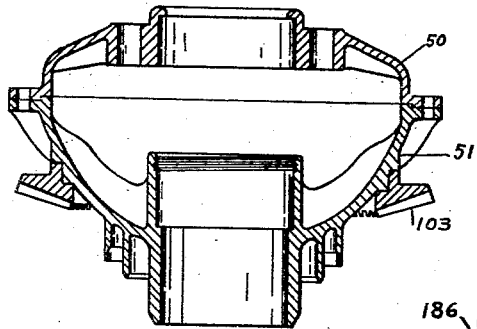
Fig. 10 is a view in vertical section of the top portion of the said rotor.
Fig. 22 is a fragmentary view in longitudinal section of a modified form of a rotor designed for mounting an electric motor thereon.

In the modified form of the rotor drum member, Fig. 22, the gear 103 of drive member 51 is dispensed with and the web 186 for mounting the electric rotary coils 187 of an electric motor is bolted to the rotor drive member. The stationary coils 188 are represented in dotted line.

The modified form of propeller blade shown in Fig. 23 has the blade 142 provided with threads 189, so that it can be made fast in the shaft 143. This form renders the blade easily removable when the vessel is drydocked. When the blade and shaft are integral, there might not be sufficient clearance between the bottom of the vessel and the floor of the drydock to permit the withdrawal of the blade and shaft. However, this modified form only requires to be dropped a fraction of its length, so that the blade 142 may be unscrewed from the shaft 143, whereupon both blade and shaft may be fully withdrawn. The vane or partition 190 is made separate in this modified form and adapted to be retained in channels 191 in the inside of the shaft 143. Manifestly, the weak part of this blade is at 192, the threaded portion, so that upon meeting an obstruction the blade would readily break at this point, and hence protect the rotor or other mounting mechanism from injury. Moreover, to detect which blade or blades have been thus broken away, it would only be necessary to cause a rod to extend down the inside of the shaft 143 and observe whether it strikes the blade or freely passes through. Obviously, upon drydocking all parts of the blades are readily accessible from the floor of the drydock, high scaffolding being unnecessary.

In Fig. 24 the outer extremity of the blade is designated as P' and the inner extremity as P". The peripheral, (i. e., velocity about the axis of the propeller,) and translational velocities of the point P' are represented vectorially by lines $V'_p$ and $V_t$ respectively, with the resultant velocity $V'_r$, the peripheral velocity being fifty percent (50%) greater than the translational velocity of the propeller, and, similarly, lines $V''_p$ and $V_t$ represent vectorially the velocity of P", with the resultant velocity $V''_r$. Be it noted that the width of this blade bears a ratio to the orbital diameter which is greater than two-tenths (.20), said greater ratio being employed to exaggerate the effect for purposes of clearer illustration. The velocity of P' about the axis of the blade, i. e., satellite velocity, is designated by $V_s$ and the actual or absolute velocity of P' by $V'_a$. Likewise, $V''_a$ designates the absolute velocity of P" when the rotational and satellite velocity are combined.

The mode of operation of a device embodying my invention is as follows. Suitable motor or power means is connected to the drive shaft 101 so that the drive pinion 102 actuates the rotor drive member through the gear 103. This causes the rotor 49 as a whole to revolve, i. e., the rotor cover 50, pendently mounted on ball bearings 47 and 48, the rotor drive member 51, the rotor shaft 59, web member 61 and blade mounting housings 62. The blade mounting housings 62 carry with them the blade bearings 134 and the blocks of lignum-vitæ bearings 136, which serve as the mountings for the blade spindles 137 in which are disposed the blade shafts 143. Furthermore, it will be noted that the mounting of the rotor is accomplished by two bearings,— the upper and lower bearings, the upper bearing consisting of ball bearings 47 and 48, and the main bearing being represented by bearing 90. This mounting is characterized by the following advantages: (1) It permits ready adjustment axially of the rotor 49 as a whole, so that driving gear 103 can be caused to mesh to a nicety with gear 102 without any disturbance of the lower parts of the mechanism, as the rotor 49 as a whole is moved axially; (2), it permits of the positioning of these bearings, performing most diverse service, sufficiently inboard to be free and clear of all exposure to water, and this positioning also renders easy the lubrication of the said bearings; (3), it also permits of the location of the main bearing, whose function is more simple, carrying only radially directed thrust, in such position that it can be lubricated with water; and (4), finally, this division of the duties of the bearings effects a great compactness, permitting as it does the main bearing to be of requisite size to carry its load without interfering with other parts, i. e., for example, the driving shaft 101 may be disposed further outboard than would be possible if it was necessary to provide an axial thrust bearing as part of the radial thrust bearing,—the only limiting feature for positioning the driving shaft 101 outboard being the length of the blade mounting housings 62. Up to this point, the means described provide for rotary movement of the blades 142 about the common axis 170, i. e., common axis of the blades, which is in fact the axis of the propeller.

The mode of operation of the timing and control means will next be set forth, i. e., the means which causes the blades to revolve on their own axes 193, 194 (Fig. 12) while collectively revolving about the common axis 170. It will be understood that the blades 142 are set in their bearings 134, so that the lines representing the projection of said blade cords 168 intersect in a common point 169, such for example as the axis of the blade in position I. (See Fig. 18.) Manifestly, the cords of the blades in positions II to IV inclusive on the lower side of that plane coinciding with the cord of the blade in position V, the common axis 170 and the longitudinal axis of the blade in position I, form angles respectively with said plane which are equal to the angles formed by the cords of the blades oppositely disposed on the upper side of the plane, i. e., of blades in positions VI to VIII, inclusive. Any two blades similarly positioned as respects this plane, such as blades in positions II and VIII, constitute a pair of blades. The line 171, 172 of intersection of this said plane with any plane through the blades at right angles to the axis 170, i. e., intermediate the length of the blades, is herein called the axis of symmetry of the blades.

The fundamental law or principle of the propeller of the type in question, for efficient or practical operation, i. e., a propeller whose blades rotate on their own axes while revolving about a common axis, is that the ratio of the blade width to the orbital diameter described by the axis of the blade is a definite factor, and should lie in the range of five one-hundredths (.05) to two-tenths (.20), all of which constitutes my discovery and invention as set forth in my Letters Patent identified above. The reasons for this relationship of the blade ratio to the diameter of the orbit, together with a detailed analysis of all the principles and factors involved, is set forth fully in the specification of my said United States Letters Patent hereinabove fully identified. The specification therein set forth is to be considered as a part hereof as if fully set forth herein in arriving at a complete understanding of the principle and law which characterizes the type of propeller herein involved.

The ratio of the actuating gears involved is such that the blades are caused to rotate upon their own axes with one-half the velocity of said axes about the common axis,— i. e., said means simultaneously causes the number of rotations of the blades on their axes to be equal to one-half the number of revolutions of the blades in their orbit about said common axis. Each blade, therefore, must make two complete revolutions in its orbit before occupying the same position in space.

Returning now to the mode of operation of the means which effects this result of causing the blades to rotate on their axes with one-half the rate of their revolving about the common axis; and returning to the mode of operation of the means by which the position of the point upon which the blade cords are trained in the orbit may be controlled: Since the planetary gears 56 are carried by the top part of the rotor, i. e., the rotor cover 50, the axes of said planetary gears are caused to revolve about the common axis 170; also, since the planetary gears 56 engage the gear 107, fixedly secured upon the outboard end of the timing and control shaft 108; and, further, since said planetary gears 56 also engage the internal timing gear 106, a rotary movement is imparted to the master gear spider 68 which is keyed to the internal gear spider 70, to which the said internal gear 106 is secured. Since the diameters of the gears 106 and 107 are proportioned four (4) to one (1), the speed of the master gear shaft 67, as respects the velocity of the rotor, is reduced to one-fourth that of the rotor 49. The master gear 139 engages the propeller blade gear 138, which causes the blade spindle 137 to revolve against the lignum-vitæ blocks 136, and as the propeller blades are securely held in said blade spindle 137 against rotary movement by the straight sides 144, the blades are caused to revolve at the same rate as do the spindles. Since the ratio of the diameters of the master gear 139 and the blade gears 138 is two to one, the blades are caused to revolve twice as fast as the master gear 139; or, since the master gear revolves one-fourth as fast as the rotor, the blades are caused to revolve one-half as fast as the rotor. Actual experience has taught the gears so disposed are subject to a minimum of wear. Such are the means which effect the timing of the blades. It will be noted that the planetary gear arrangement provides for a long lever arm to hold securely the master gear spider 68 by having the gear 56 mesh with gears 106 in a substantial spaced relation with the axis 170 of the propeller.

This secure holding of the master gear spider is most highly important for the following reason: Referring to Fig. 25, it will be noted that the velocity vector $V'_p$ is much longer than the velocity vector $V''_p$, i. e., the forces opposing that portion of the blade extending outside of the orbit will be much greater than the forces operating on that portion of the blade lying within the orbit. This results in stresses tending to force P' back in a clock-wise direction. This means that the mechanism designed to control and determine the point upon which the blade cord trains must assume a very heavy burden. I overcome the difficulties incident to the designing of such controlling mechanism in part by shortening the blade width, i. e., by providing a blade whose width bears the ratio to the orbital diameter as defined in my said Letters Patent, i. e., where the ratio of the blade width to the orbital diameter lies in the range of five-one hundredths (.05) to two-tenths (.20). It will be noted that the forces developed, and which correspond to velocity vectors $V'_p$ and $V''_p$, vary as the square of said velocities; hence, it is evident that to make the blade width greater would move point P' further from the center of the blade, and would thereby greatly increase $V'_p$, and, conversely, vector $V''_p$ would be greatly decreased by moving P" further from the center of the blade, i. e., the unbalancing of the forces distributed on that portion of the blade cord extending outside of the orbit, as compared to those on the inside of the orbit, would be greatly magnified. My providing of the proper blade ratio obviously for the most part overcomes this control difficulty. However, by actual experience I have learned that every mechanical advantage must be utilized to effect a secure holding of the master gear for the reasons indicated. If this is not done, a torque will occur in the timing and control shaft, which will permit the blades to become displaced from their proper training upon the point of symmetry, and when this occurs there results most severe and violent vibrations. Manifestly, since the timing and control shaft is about one-third the length of the propeller, the tendency for any torque in the same to occur is reduced to a minimum or, in fact, is eliminated. Therefore, this reduction in length of the said shaft also in part solves the control difficulty, and constitutes one of the important features of my present invention, and is made possible by the selection of means set forth and, in particular, by the disposition of the rotor parts.

The means by which the timing and control shaft may be independently revolved about the axis 170 is as follows: By actuating the wheel 124, rotary movement is imparted to the spur gear 113, which in turn actuates gear 132; this in turn the mitre gear 129; this in turn the worm 126; and this in turn the worm gear 110, which is keyed by key 115 to the reversing gear disk 114, which carries in its notches 116 or 117 the reversing gear latch 118, which in turn through the reversing gear hub 120 is keyed to the timing and control shaft 108. Obviously, to cause the timing and control shaft 108 to revolve as respects the axis 170 effects a turning of the master gear spider 68 and the master gear 139 therefore without a turning of the rotor 49. By thus turning the master gear 139 the blade gear 138 revolves, which revolves the blade spindles 137, and, therefore, the blades 142 themselves, so that all the blade cords may be caused simultaneously to change the point on which they train. This point may be changed through an arc of one hundred and eighty degrees (180°) by means of the reversing latch 118 directly connected to the shaft 108 by causing the latch 118 to be shifted from notch 116 to 117 or vice versa.

Obviously, there will be a very great centrifugal force developed by the blades and their mountings. To reduce the wear on the bearings, and particularly on the blocks 136 and the main bearing blocks 91, and to insure a positive engagement between the master gear 139 and the blade gears 138, there may be provided a retaining ring 141, which functions to bind all the blades together and make them operate to support each other and hold each other in place as respects said master gear. By pendently mounting the rotor 49 and master gear spider 68 upon the ball bearings 74 and rendering said rotor and master gear spider 68 and associated parts relatively independent of the timing and control shaft 108,—i. e., by "independent" is meant being not integrally formed therewith,—the wear upon the bearings is reduced to a minimum, for the rotor 49 and its associated parts are obviously made self-contained by said pendent mounting. Any displacement by the rotor 49 and its associated parts from the axis of the timing and control shaft would in no wise permit the master gear 139 to become displaced from the blade gear 138. When said ring 141 is employed, it also operates as a roller bearing for the blade spindles, inasmuch as it will receive a rotary motion with respect to the axis 170 being floatingly mounted.

The bottom area of the master gear spider 68 and the bottom cover 65 of the rotor is subjected to the hydrostatic pressure existing for the particular depth at which said part may be disposed, and also it is subjected to the hydrostatic pressure developed by the revolving of the blades themselves. This pressure is such that it greatly reduces the weight sustained by the ball bearings 47 and 48, and the buoyant effort thus developed, assisted by the reduction in weight of the rotor, effected by throwing out of the water by centrifugal force as hereinafter set forth, minimizes the wear on the bearings and affords a propeller of efficient operation.

Figure 1:
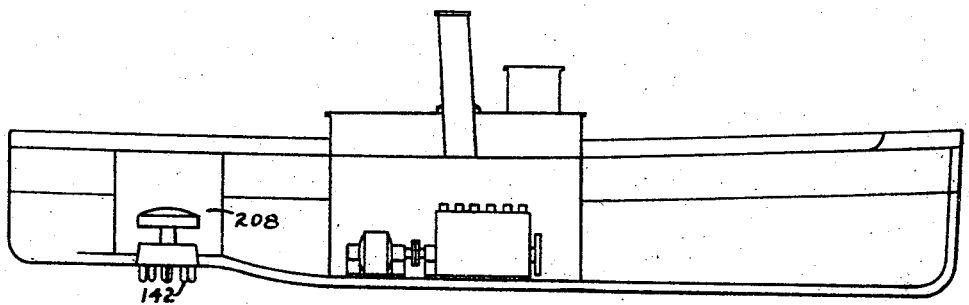
Figure 1 is a view in longitudinal section of an engine driven marine vessel with a propeller embodying my invention.
Figure 2:
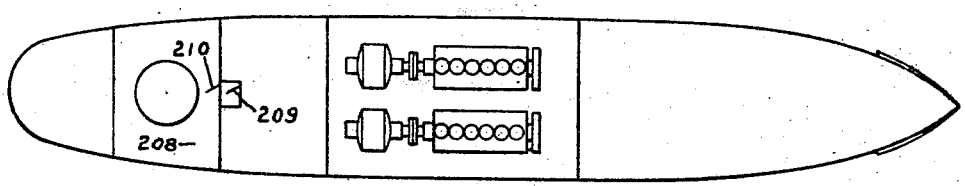
Fig. 2 is a plan view of the same.
Figure 3:
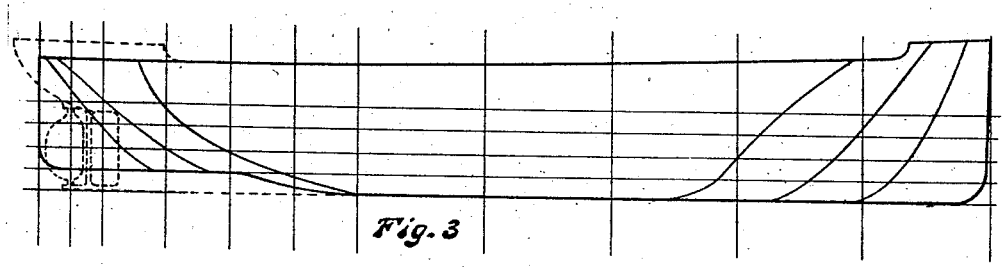
Fig. 3 is a view in side elevation of the hull of said vessel, showing the buttock lines in full and also showing the outline of the stern in dotted line which would be necessary for a screw type of propeller with a hull of the same displacement.
Figure 4:
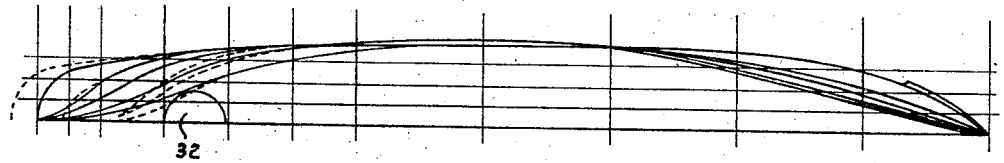
Fig. 4 is a plan view of the said hull with water lines in full and also showing the water lines at the stern in dotted line which would be necessary for a screw type of propeller.
Figure 5:
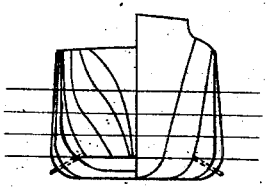
Fig. 5 is a view in elevation of the bow and stern showing hull sections.
Figure 6:
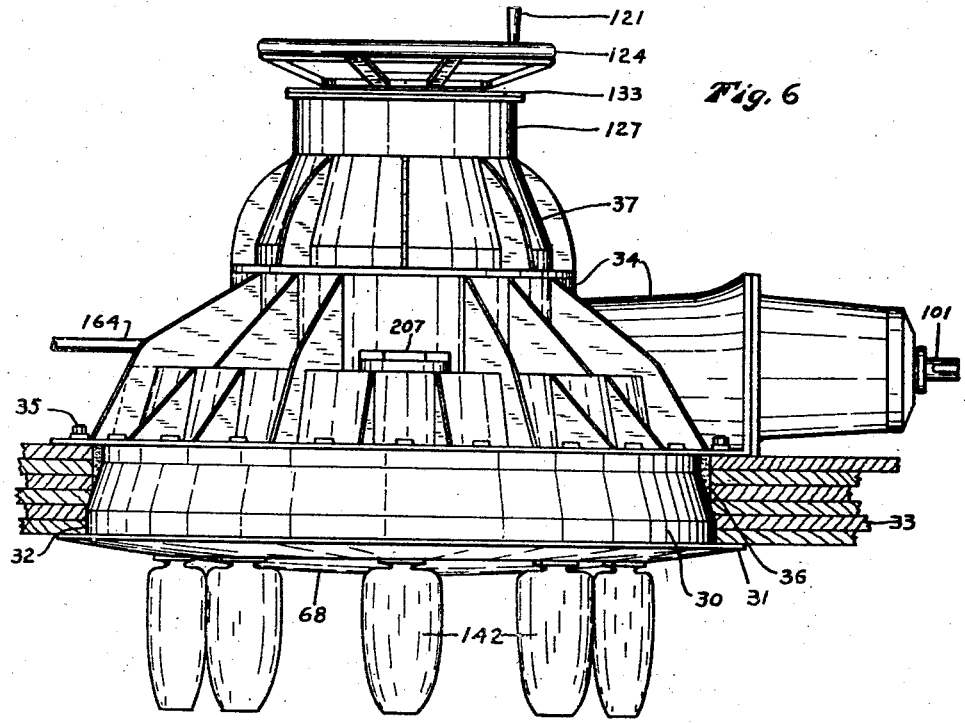
Fig. 6 is a view in side elevation of the propeller part of my invention.
Figure 8:
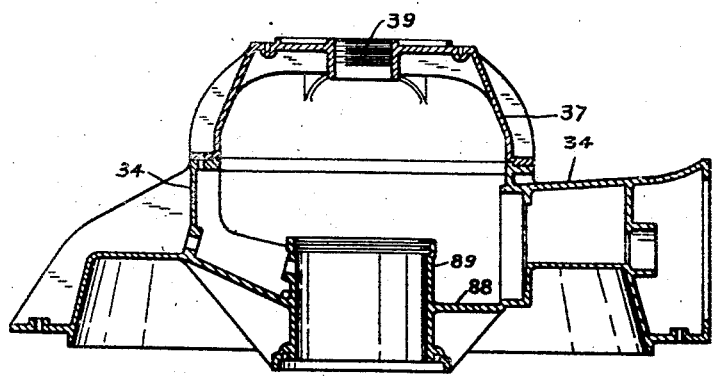
Fig. 8 is a view in vertical section of a part of the propeller housing along said axis.

By disposing the propeller in the ring or casing 30, the propeller itself is obviously caused to form or constitute across the opening a part of the hull wall 33 with no part protruding beyond the hull contour, excepting that portion of the propeller blades which actually make engagement with the water. Since the ring or casing 30 is secured as a lining for the opening in the hull wall 33, manifestly the rim of the opening is preferably disposed in the same plane. That is, that portion of the hull wall of a vessel embodying my invention, which portion is occupied by the propeller mechanism, should be flat and this constitutes the sole interference with designing the stream line solely with reference to minimum resistance. As appears in Fig. 4, refined and easy stream lines may extend from stem to stern, and as the lines Fig. 4 show, the cargo space may be greatly increased. A vessel embodying my invention does not require any overhanging portion which constitutes "waste length" to provide mounting or tiller space for the rudder and its parts,—all rudder appendages being omitted. The increased cargo space is graphically shown by the positions of the corresponding lines in dotted line for a screw propeller installation.

Where lignum-vitæ bearings are used, water may be employed as the lubricating means, and its course through the device embodying my invention may be as follows: Through pipe 164 water may be introduced into the recesses 165 between the lignum-vitæ blocks 91 into compartment 97, i. e., it will fall upon the rotor web member 61 and will be subjected to centrifugal force, which will cause it to ascend the baffle plate 197 and pass to the peripheral portion of the rotor web member 61, where the centrifugal force will be still greater. Thereupon, the water will be dispelled by centrifugal force through the channel 198; vanes 199 radially disposed in the periphery of the rotor web member 61 substantially aid in building up the ejecting pressures. Water also will enter through port 202 to the hollow shaft 67; thence through port 81 to bearings 96 and thence into chamber 201; from whence it will escape between gear teeth 139 and 138. However, some water may follow channel 200 to grooves 85 and thence out through channel 87, being impelled therethrough by centrifugal force and join the water coming in through pipe 164. Such water as may reach the grooves 85 above passageway 87 will require the grooves to be filled up successively and such pressure to cause seepage rebuilt in each groove, so that the water is greatly retarded. Finally, packing 86 further insures against the water reaching the ball bearing 74.

The lignum-vitæ blocks 136 of the blades may be lubricated as follows: Alternately, the ports 154 and 155 of the propeller blade are exposed to that side of the propeller upon which the pressure is being created, so that water will pass through said ports and into chambers 157 and 158; fill the same; thence pass through passageways 159 and 160; thence to the lignum-vitæ blocks 136, so that the same are all supplied with water as a means of lubricating said bearings.

The lubrication of the driving pinion and driving gear will be manifest from the description of the construction of the same, which construction constitutes an important feature of my invention. The chamber 98 is filled with a suitable lubricant, which will be carried by the driving pinion 102 to the driving gear 103. The ball bearing 100 is obviously directly exposed to the lubricant in chamber 98.

The timing and control mechanism is lubricated as follows: Suitable lubricant is supplied to the chamber 203 inside the timing and control shaft 108, which functions as a reservoir, as it were, from whence it passes through passageway 204 to the chamber 205 occupied by the planetary gears 56. The centrifugal force causes said lubricant to pass outwardly, in the meantime lubricating the bearings of the planetary gears 56, and gradually said lubricant finds its way between the planetary gears and the internal timing gear into chamber 206 formed by the drive member 51, so that ball bearing 74 receives proper lubrication. During operation the centrifugal force will cause the lubricant to take position in the peripheral portion of chamber 206. Hence, the disposition of these parts, as throughout the propeller, is caused to cooperate with the operation of the device to provide an efficient lubricating system, the entire propeller being provided with lubrication with only two chambers to be supplied with lubricant.

When the propeller is not in operation, the water will rise in and may largely fill chamber 97, air being trapped within same. The operation of the propeller through the centrifugal force developed expels the water from the chamber as hereinabove explained.

If injury should occur to any one of the blades while the vessel is between ports at sea, it is only necessary to remove the cover 207 and key 152. Blade nut 146 is then removed and a rod with a threaded end portion on one end is screwed into the threaded recess 158 in nut 151 secured in the interior of the blade shaft 143. A suitable line is then made fast to said rod and the blade is displaced from the blade spindle 137. Suitable means are then employed to reach over the side of the vessel and raise the lowered blade to the deck, whereupon a new blade may be secured to the rod or the blade properly repaired and the process reversed for replacing the said blade; or, if a supply of other blades is not available, the blades in the propeller may be redistributed and such blades as may be necessary may be removed to provide the necessary balance in the operation of the propeller. Manifestly, this avoids all necessity for being towed to port and avoids all the expensive delay in being drydocked, as well as the cost of delay and loss of operating time.

In the event of more serious injury, the parts are so disposed that the entire propeller may be taken to pieces and hoisted to the deck for repair; or the propeller as a whole may be hoisted either to the deck or to such elevation in the chamber 208 as may be desired, and said chamber may first be filled with compressed air, said chamber having double airlock door means 209 and 210, whereby the water may be kept to the desired level in said chamber while the propeller is being repaired, either in elevated position or in place.

It will be noted that the mode of operation of a propeller having a blade embodying my invention is such that the blade will sustain a uniform load from the point of cantilever support to the extreme point of overhang, and will be characterized by having all points of its length moving with the same velocity, whereby the phenomenon of cavitation is eliminated. Hence, since cavitation is eliminated, the efficiency of a propeller embodying my invention is not diminished by any such phenomenon.

Be it very particularly noted that the principle of operation of a propeller embodying my invention is such that it practically does not require any sacrifice of the principles of proper designing of the hull, as respects easy or fine stream lines, to afford a mounting for the propeller. This is in most decided contrast with the screw type of propeller, the principle of operation of which positively requires that it be disposed astern of the vessel and requires a sharp curving in of the hull lines to permit a free, or rather as free as possible, stream to the propeller, so that the best stream lines for the hull are not possible. Since the principle of operation of the propeller embodying my invention is such that it may be mounted in the hull at any part of the same, i. e., on the bottom, or on the sides, in the bow, or astern, it is possible to avoid the long heavy shaft, which under present practice necessitates a relatively large dead load loss as well as presents problems of refinement in respect to propeller aligning of the said shaft with the propeller machinery and the propeller journal. Since the propeller shafting embodying my invention may be disposed in any part of the hull in a plane at right angles to the longitudinal axis, it is obvious that the shaft may be relatively short, which makes possible the mounting of an electric motor directly on the inboard end of said shaft, and the electric conductors which transmit the power to said motor may therefore be led to any part of the vessel in which it may be deemed best to locate the prime mover. Hence, in place of the heavy, carefully aligned shaft of present practice design, a propeller embodying my invention may have substituted therefor the light weight flexible electric cables.

An important advantage which a vessel embodying my invention has, incident to the utilization of electric driving means, is that all difficulties incident to the utilizing of high speed engines, such as the Diesel or turbine form of engine, are overcome. Manifestly, the prime mover may be such high speed type of engine, and this may be most efficiently used in developing electric power and this conveyed to the electric motor mounted directly on the inboard end of the propeller shaft. Thus, my invention makes adaptable the most efficient engine types of the present day for marine purposes.

A vessel embodying my invention is characterized by a most remarkable "quick get away," that is, it may be caused to move at full speed through the water in a period of time far shorter than is at present possible by a screw propeller designed otherwise for similar work.

Also, since a propeller embodying my invention may be disposed in the bottom of the vessel, it is manifest that the danger of said propeller being lifted free of the water by a turbulent sea is practically eliminated, and this means that the danger of racing the machinery incident to such removal from the water, and the great risk of severe injury resulting therefrom, is eliminated. By thus insuring against the removal of the propeller from the water, the great risk incident to exposing the propeller to wreckage floating on or near the surface is also eliminated. Thus, a most important advance in point of view of safety is provided by a vessel embodying my invention.

A further feature incident to disposing the propeller in the bottom portion of the vessel, so that it is always under water, and also incident to the fact that the propeller embodying my invention embodies within itself the means for steering and directing the course of the vessel is the feature that all difficulties of steering the vessel when under ballast are eliminated. As is well known, the steering of a vessel having a rudder when under ballast is entirely different from the steering of the same vessel when the propeller is completely immersed. Since the rudder must be maintained in a position to compensate for the unbalanced thrust of the propeller, there results a great loss of the speed due to the extra resistance arising from the said positioning of the rudder. Often, long distances must be run under this handicap. The mode of operation of a propeller embodying my invention obviously overcomes all such difficulty, and the steering principle is precisely the same when the vessel is under ballast as when loaded, and furthermore, be it particularly noted, said vessel having my propeller loses none of the propeller thrust due to its being loaded or light. To provide positively for immersion of the propeller under load, it is manifest that in the case of the screw propeller type it is limited in size between the surface of the water and the plane of the bottom of the keel. Obviously, no such limitation characterizes a propeller embodying my invention.

By making it possible to utilize a shaft to operate a propeller embodying my invention, which shaft lies in a plane disposed at practically right angles to the longitudinal axis of the vessel, it is manifest that great compactness is possible, and, therefore, the concentration permits of better armor protection as well as reduces the danger otherwise incident to a long target, such as the long driving shaft of present design.

Actual experience has demonstrated that the mode of operation of a vessel embodying the combination of a hull and propeller embodying my invention is such as to greatly reduce the size of the wake, so that the vessel may be designed to operate more nearly in one plane, i. e., so that the trim, or relative positions of the bow and stern, will not be as greatly displaced as heretofore. This reduction in the size of the wake is one manifestation of the cooperation between the hull and the propeller. Since the end portions of the vessel may be designed to have sufficient buoyant effect to more nearly carry themselves, there is not the tendency for the hull to sink at the stern and produce the large sized wake that is common at present. Moreover, the reduction in the proportions of the wake is also due to the operation of the propeller.

A fundamental feature of cooperation between the propeller embodying my invention and the hull of the vessel is that my propeller in and of itself constitutes a portion of the hull wall, across the opening occupied by the propeller itself, and by the disposition of all parts of the propeller, excepting the water engaging end portions of the blades within the outside line of the hull wall there is made possible the very great advantage of eliminating all appendage resistances due to rudder and propeler. It is manifest that the only limitation put upon the designing of the hull is that the rim surrounding the opening in which the propeller embodying my invention is disposed will preferably lie in the same plane, i. e., the portion of the hull wherein a propeller embodying my invention is disposed should present a flat area. Obviously, however, this may be relatively local to the portion in which the propeller is mounted.

An engine driven marine vessel embodying my invention is characterized by the facility with which it may be maneuvered. Since the steering means is identical with the propulsion means, the steering operation is not dependent upon casting a stream against a separate rudder mechanism, so that the steering is a secondary or indirect result, and, therefore, the thrust of the entire propeller itself of my invention is directly available for maneuvering purposes. Since the direction of the propeller thrust may be changed in any direction, i. e., throughout a range of three hundred and sixty degrees (360°) without reversing the direction of the propulsion means, it is manifest that there is no loss of time in changing the course of the vessel due to reversing the direction of the propulsion means. In case of the discovery of imminent danger ahead in time of a fog, the propulsion thrust may be instantly reversed from speed ahead to full speed astern. The direction of the driving mechanism in a vessel embodying my invention is always in one direction. This makes possible the utilization of much lighter weight mechanism throughout and the elimination of all heavy mountings incident to the very large shafts of present practice, which must necessarily be designed of heavy proportions so as to be capable of absorbing the stresses and kinetic energy in bringing the propeller and associated mechanism to a standstill and in starting and accelerating forthwith in the opposite direction.

A further very important feature relating to the maneuverability of a vessel embodying my invention is that the guiding of the vessel may be brought entirely within the direct control of the operator at the wheel, that is, he not only has control of guiding the course of the vessel, but also direct control of the degree of propulsion force actuating the vessel. Thus, all factors relating to maneuverability are directly in the hands of the operator at the wheel without the necessity of communicating orders to the engine room to govern the propulsion force.

By making reference to Fig. 19, it will appear that the screw type of propeller is disposed near the longitudinal axis of the vessel, if not directly in said axis, and in addition to the disadvantage of such location, the mode of operation of the propeller itself is such as to augment rather than minimize the rolling of the vessel due to the wave action. On the other hand, the mode of operation of a propeller embodying my invention cooperates with the hull in opposing such rolling action. Manifestly, the propeller operating in spaced relation to the longitudinal axis of the vessel tends to utilize such spaced relation as a lever arm in opposition to any such rolling tendency. The disposition of the propeller in the bottom of the vessel enables it to operate in this manner, and the mode of operation of the propeller being such as to enable it to operate in a plane that is parallel to the longitudinal axis is further responsible for such cooperation. This is thought to be explained by the fact that the blades, by their collective revolving in said plane parallel to the longitudinal axis, create a certain dynamic action, which operates to make the blades hold themselves within the stream which they produce, and thereby tends to resist any rolling action. This propeller stream extends for some distance in front and to some distance astern of the propeller. Obviously, this stream resists lateral fluctuation of displacement as respects the surrounding water, which is relatively at a standstill. Actual experience with a vessel embodying my invention has established that there is developed this steadying effect, so that the vessel is characterized by a very high degree of stability.

As respects the modified form of vessel of the submarine type illustrated in Figs. 20 and 21, it will be manifest that the propulsion force of the propeller disposed on the sides may be directed upwardly so as to make the vessel sink very quickly. This may be done without translational movement, and by disposing the propeller in the stern portion as indicated, it is manifest that the steeering of the vessel in the horizontal plane is most fully provided for.

Obviously, changes may be made in the forms, dimensions, and arrangement of the parts of my invention, without departing from the principle thereof, the above setting forth only preferred forms of embodiment.

I claim:

1. An engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, a rotor operatively mounted in said housing which expels water therefrom; and a plurality of propeller blades mounted in said rotor.

2. An engine driven marine vessel embodying a hull wall, having an opening therein; a propeller mounted in said opening, having a rotor, said propeller constituting a portion of the hull wall; and a plurality of propeller blades having a shaft portion and a blade portion, each of said blades being mounted solely by said shaft in said rotor, and having the blade portion only protruding beyond said hull wall.

3. An engine driven marine vessel embodying a hull wall having an opening therein; a propeller mounted in said opening, having a rotor, said propeller constituting a portion of the hull wall; and a plurality of propeller blades having a shaft portion and a blade portion, each of said blades being rotatably mounted as respects its own axis solely by said shaft in said rotor, and having the blade portion only protruding beyond said hull wall.

4. An engine driven marine vessel embodying a hull wall having an opening therein; and a propeller operatively mounted in said opening, said propeller including a rotor having a bottom plate which forms a cover for said opening with peripheral clearance for the rotation of the same.

5. An engine driven marine vessel embodying a hull wall having an opening therein; a rotor mounted in said opening, said rotor including a bottom plate which forms a cover for said opening with peripheral clearance for the rotation of the same; and a plurality of propeller blades, each rotatably mounted as respects its own axis and extending through said cover.

6. An engine driven marine vessel embodying a hull wall having an opening in the bottom thereof; and a propeller operatively mounted in said opening, said propeller including a bottom plate which forms a cover for said opening with peripheral clearance for the rotation of the same.

7. An engine driven marine vessel embodying a hull wall having an opening therein; and a propeller mounted in said opening, said propeller including a plurality of propeller blades, which blades rotate continuously on their own axes while revolving in an orbit about the axis of said propeller the ratio of the width of said blades to the diameter of the orbit being of such degree of smallness that the angle of incidence formed by said blades with the direction of their movement through the fluid medium will be wholly upon one side of each blade throughout its orbital revolution.

8. An engine driven marine vessel embodying a hull wall having an opening therein; a propeller mounted in said opening, said propeller including a rotor having a bottom plate which forms a cover for said opening with peripheral clearance for rotation of the same; and a plurality of propeller blades operatively disposed in said rotor, which blades rotate continuously on their own axes while revolving in an orbit about the axis of said rotor, the ratio of the width of said blades to the diameter of the orbit being of such degree of smallness that the angle of incidence formed by said blades with the direction of their movement through the fluid medium will be wholly upon one side of each blade throughout its orbital revolution.

9. An engine driven marine vessel embodying a hull wall having an opening in the bottom thereof; and a rotor revolvably mounted in said opening, said rotor including a bottom plate which forms a cover for said opening with peripheral clearance for rotation of the same and a plurality of blades mounted in said rotor, said blades being continuously revolvable on their own axes and the plane of rotation of said blades being substantially parallel to the longitudinal axis of the vessel, whereby the operation of said propeller holds said hull in opposition to rolling.

10. An engine driven marine vessel embodying a hull wall having an opening therein; a propeller operatively mounted in said opening, said propeller including a rotor and a plurality of propeller blades, each continuously rotatively mounted as respects its own axis in said rotor, all parts of said propeller, except the water engaging portion of said blades, being enclosed within the hull wall.

11. An engine driven marine vessel embodying a hull wall having an opening therein; a propeller operatively mounted in said opening, said propeller including a rotor and a plurality of propeller blades, each continuously rotatively mounted as respects its own axis in said rotor, all parts of said propeller, except the water engaging portion of said blades, being enclosed within the line of the hull wall, said blades being disposed with their transverse axis trained upon a common point, forming thereby a condition of mechanical symmetry; and means to control the location of said point whereby the direction of the propulsive thrust, and thereby directly the course of the vessel, may be controlled.

12. An engine driven marine vessel embodying a hull wall having a form as respects stream lining producing minimum resistance from stem to stern, and having an opening therein; a propeller operatively disposed in said opening including a rotor, the bottom face of which is disposed flush with the hull wall, said rotor having blades which rotate on their own axes while revolving together about the axis of said propeller, all parts of the propeller, except the water engaging portion of the blades, being within the lines of the hull.

13. An engine driven marine vessel embodying a hull wall having an opening therein, the rim of which lies in the same plane, the adjacent portions of the hull being stream lined accordingly; a propeller operatively disposed in said opening including a rotor and blades, each being continuously rotatively mounted therein, the bottom face of which rotor forms a cover for said opening.

14. An engine driven marine vessel embodying a hull wall having a form producing minimum resistance from stem to stern, said hull wall at no point presenting a part projecting beyond its contour, which opposes the movement of the vessel, said hull wall having an opening therein; and a propeller operatively mounted in said opening, having blades which rotate on their own axes while revolving in an orbit about the axis of said propeller, all portions of said blades, except the water engaging portion, being within the contour of the hull wall.

15. An engine driven marine vessel embodying a hull wall having an opening therein and a propeller embodying a rotor and blades mounted in said rotor, each of which is rotatively mounted as respects its own axis, said rotor including a bottom plate which forms a cover for said opening with peripheral clearance for the rotation of the same and also having means for the ejection of water from said opening by the revolution of said rotor.

16. An engine driven marine vessel embodying a hull wall having an opening therein; and a propeller operatively mounted in said opening, said propeller including a rotor having a bottom plate which forms a cover for said opening with peripheral clearance for the rotation of the same, said rotor also having means for ejecting water from said opening by the revolution of said rotor.

17. An engine driven marine vessel embodying a hull wall with a form having an entrance and let go portion and a stern displacement of such magnitude as to render same self buoyant per unit of length, said hull wall having maximum easy stream lines from stem to stern with an opening in the wall, and a propeller operatively disposed in said opening, said propeller having blades which rotate on their own axes while revolving together about the axis of said propeller.

18. An engine driven marine vessel embodying a hull wall with a form having an entrance and let go portion and a stern displacement which renders same self buoyant per unit of length, said hull wall having maximum easy stream lines from stem to stern, the load water lines converging to a point which lies in a vertical plane substantially coincident with the sternmost projection of the deck sheer line, said hull wall having an opening and a propeller operatively disposed in said opening, said propeller having blades which rotate on their own axes while revolving together about the axis of said propeller.

19. An engine driven marine vessel embodying a hull with a form having an entrance and let go portion and a stern displacement of such magnitude as to render same self buoyant per unit of length, said hull wall having maximum easy stream lines from stem to stern, the load water lines converging to a point which lies in a vertical plane substantially coincident with the sternmost projection of the deck sheer line, said lines of the underwater portion being no shorter than at the water line, part of said lines being inversely curved in the stern portion, whereby advantage is taken of the back wash, said hull wall having an opening and a propeller operatively disposed in said opening, said propeller having blades which rotate on their own axes while revolving together about the axis of said propeller, all parts of said propeller, except the water engaging portion of said blades, being enclosed within the lines of the hull wall.

20. In combination with an engine driven marine vessel having a hull wall with an opening therein, a propeller operatively disposed in said opening embodying a rotor having an axially disposed shaft, a plurality of blades, having blade gears, operatively disposed in said rotor, actuating gear means in operative engagement with said rotor and blade gears, and timing and control means operatively connected to said blade gear means and mounted inboard the end of said rotor shaft, whereby the alignment of said blades may be determined and said blades may be caused to rotate on their own axes while revolving in an orbit about the axis of the propeller, said timing and control means being thereby accessible from within the hull.

21. In combination with an engine driven marine vessel having a hull wall with an opening therein, a propeller operatively disposed in said opening embodying a rotor pendently mounted, a plurality of blades, having blade gears, operatively disposed in said rotor, actuating gear means in operative engagement with said rotor and blade gears, and timing and control means operatively connected to said gear means, whereby the alignment of said blades may be determined and said blades may be caused to rotate on their own axes while revolving in an orbit about the axis of the propeller.

22. In combination with an engine driven marine vessel having a hull wall with an opening therein, a propeller operatively disposed in said opening embodying a propeller housing enclosing said opening, a rotor member axially suspended from said housing, a plurality of blades, having blade gears, operatively disposed in said rotor, actuating gear means in operative engagement with said rotor and blade gears, and timing and control mechanism operatively connected to said blade gears.

23. In combination with an engine driven marine vessel having a hull wall with an opening therein, a propeller operatively disposed in said opening embodying a bell shaped propeller housing enclosing said opening, whereby the minimum of space is required for said propeller, a rotor operatively disposed in said housing, a plurality of blades having blade gears, operatively disposed in said rotor; actuating gear means in operative engagement with said rotor and blade gears, and timing and control means operatively connected to said blade gears and mounted inboard said rotor.

24. In combination with an engine driven marine vessel having a hull wall with an opening therein, a propeller operatively disposed in said opening embodying a rotor, means whereby the water is kept out of said opening, whereby said rotor in operation has hydrostatic pressure on its outboard side only, a plurality of blades operatively disposed in said rotor, and actuating means for said rotor and blades.

25. In combination with an engine driven marine vessel having a hull wall with an opening therein, a propeller operatively disposed in said opening embodying a rotor having means for ejecting the water from said opening, whereby said rotor in operation has hydrostatic pressure on its outboard side only, a plurality of blades operatively disposed in said rotor, and actuating means for said rotor and blades.

26. In combination with an engine driven marine vessel having a hull wall with an opening therein, a propeller operatively disposed in said opening embodying a rotor having water discharging vanes which eject the water from said opening, whereby said rotor in operation has hydrostatic pressure on its outboard side only, a plurality of blades operatively disposed in said rotor, and actuating means for said rotor and blades.

27. In combination with an engine driven marine vessel having a hull wall with an opening therein, a propeller operatively disposed in said opening embodying a rotor having the bottom thereof substantially flush with the hull wall and means for ejecting the water from said opening, whereby said rotor in operation has hydrostatic pressure on its outboard side only, a plurality of blades operatively disposed in said rotor, and actuating means for said rotor and blades.

28. In combination with an engine driven marine vessel having a hull wall with an opening therein, a propeller operatively disposed in said opening embodying a propeller housing having that portion adjacent said opening flaring towards the outboard side, a rotor having water discharging vanes which, together with said flaring portion of the housing, eject the water from said opening, whereby said rotor in operation has hydrostatic presure on its outboard side only, a plurality of blades operatively disposed in said rotor, and actuating means for said rotor and blades.

29. In combination with an engine driven marine vessel having a hull wall with an opening therein, a propeller operatively disposed in said opening embodying a rotor having a web member, an axially disposed mounting shaft and peripherally disposed blade mounting housings in said web, a plurality of blades operatively disposed in said rotor, and actuating means for said rotor and blades, said rotor and blades being removable as a unit from the opening in the hull.

30. In combination with an engine driven marine vessel having a hull wall with an opening therein, a propeller operatively disposed in said opening embodying a propeller housing having a transversely disposed wall forming thereby two independent chambers, one disposed above the other, a rotor having a web member, in which are peripherally disposed blade mounting housings and an axially disposed mounting shaft surmounted by a driving gear, the said web and blade mounting housings being located in said lower chamber and said driving gear being located in the upper chamber, said chambers being water insulated one from the other, a plurality of blades operatively disposed in said rotor, and timing and control means in operative engagement with said blades.

31. In combination with an engine driven marine vessel having a hull wall with an opening therein, a propeller operatively disposed in said opening embodying a propeller housing having a transversely disposed wall forming thereby two independent chambers, one disposed above the other, a rotor having a web member in which are peripherally disposed blade mounting housings and an axially disposed mounting shaft, surmounted by a chamber forming case having on its outside a driving member, the said web and blade mounting housings being located in said lower chamber and said chamber forming case being located in the upper chamber, said chambers being water insulated one from the other, planetary gears mounted inside said chamber forming case, a plurality of blades having blade gears operatively disposed in said rotor, a master gear engaging said blade gears, said master gear having an axially disposed mounting shaft, and a gear mounted on the top of said shaft which gear meshes with said planetary gear, and a timing and control means in operative engagement with said planetary gears.

32. In combination with an engine driven marine vessel having a hull wall with an opening therein, a propeller operatively disposed in said opening embodying a rotor having an axially disposed mounting shaft surmounted by a gear carrier having a driving member thereon, planetary gears disposed on said gear carrier, a plurality of blades having blade gears operatively disposed in said rotor, a master gear engaging said blade gears, said master gear having an axially disposed mounting shaft and a gear mounted on the top of said shaft, which gear meshes with said planetary gear.

33. In combination with an engine driven marine vessel having a hull wall with an opening therein, a propeller operatively disposed in said opening embodying a rotor having an axially disposed mounting shaft surmounted by a gear carrier having a driving member thereon, planetary gears disposed on said gear carrier, a plurality of blades having blade gears operatively disposed in said rotor, a master gear engaging said blade gears, said master gear having an axially disposed mounting shaft and a gear mounted on the top of said shaft which gear meshes with said planetary gear, a timing and control shaft axially disposed in said propeller having a gear meshing with said planetary gears, and a holding means for said control shaft.

34. In combination with an engine driven marine vessel having a hull wall with an opening therein, a propeller operatively disposed in said opening embodying a rotor having an axially disposed mounting shaft surmounted by a gear carrier having a driving member thereon, planetary gears disposed on said gear carrier, a plurality of blades having blade gears operatively disposed in said rotor, a master gear engaging said blade gears, said master gear having an axially disposed mounting shaft and a gear mounted on the top of said shaft, which gear meshes with said planetary gear, a timing and control shaft axially disposed in said propeller having a gear meshing with said planetary gears, a holding means for said control shaft, a worm gear idly mounted on said control shaft, a disk secured on said worm gear, connecting said gear with said holding means, and a worm meshing with said worm gear.

35. In combination with an engine driven marine vessel having a hull wall with an opening therein, a propeller operatively disposed in said opening embodying a plurality of blades which rotate on their own axes while revolving together in an orbit about the axis of the propeller and a retaining ring operatively disposed with respect to said blades.

36. In combination with an engine driven marine vessel having a hull wall with an opening therein, a propeller operatively disposed in said opening embodying a plurality of blades which rotate on their own axes while revolving together in an orbit about the axis of the propeller and a retaining ring operatively disposed with respect to said blades, the ratio of the width of said blades to the orbital diameter being of such degree of smallness that the angle of incidence formed by said blades with the direction of their movement through the fluid medium will be wholly upon one side of each blade throughout its orbital revolution.

37. In combination with an engine driven marine vessel having a hull wall with an opening therein, a propeller operatively disposed in said opening embodying a rotor, a retaining ring, a plurality of blades operatively disposed in said rotor, said blades having blade gears and a rolling bearing for engagement with said retaining ring, and actuating gear means in operative engagement with said rotor and blade gears.

38. In combination with an engine driven marine vessel having a hull wall with an opening therein, a propeller operatively disposed in said opening embodying a rotor pendently mounted, a retaining ring, a plurality of blades operatively disposed in said rotor, said blades having blade gears and a rolling bearing on which said retaining ring is rotatively mounted, whereby the centrifugal force developed by said blades may be assumed by said ring and said rotor rendered self contained, whereby the positive wear on parts is reduced to a minimum, and actuating gear means in operative engagement with said rotor and blade gears.

39. In combination with an engine driven marine vessel having a hull wall with an opening therein, a propeller operatively disposed in said opening, embodying a rotor, a plurality of blades which rotate on their own axes while revolving in an orbit about the axis of said rotor, the ratio of the width of said blades to the orbital diameter being of such degree of smallness that the angle of incidence formed by said blades with the direction of their movement through the fluid medium will be wholly upon one side of each blade throughout its orbital revolution, said blades being of a spade-like form, and protruding beyond the said frame, whereby is afforded a marine propeller whose blades travel with uniform velocity throughout their entire length and sustain a load practically uniform throughout said length, whereby cavitation is eliminated, and means to produce rotation of the blades on their own axes with cyclic performance periodically uniform for every revolution of the blades about said orbit.

40. An engine driven marine vessel embodying a hull wall, having an opening therein; a propeller mounted in said opening, having a rotor, the main bearing of said rotor being substantially in the plane of the hull wall; and a plurality of propeller blades each having a shaft portion and a blade portion, each of said blades being mounted solely by said shaft in said rotor and having the blade portion protruding beyond said hull wall.

41. An engine driven marine vessel as claimed in claim 1, wherein each of said propeller blades has a shaft and a blade portion and each of said blades is mounted solely by said shaft in the rotor, and has the blade portion only protruding beyond the hull wall.

42. An engine driven marine vessel as claimed in claim 1, wherein the propeller blades are disposed with their transverse axes trained upon a common point, forming thereby a condition of mechanical symmetry, and means to control the location of said point whereby the direction of the propulsive thrust and thereby directly the course of the vessel may be controlled.

43. An engine driven marine vessel as claimed in claim 1, wherein the ratio of the width of the propeller blades to the diameter of their orbit is of such degree of smallness that the angle of incidence formed by said blades with the direction of their movement through the fluid medium will be wholly upon one side of each blade throughout its orbital revolution.

44. An engine driven marine vessel as claimed in claim 1, embodying a hull wall having a form as respects stream lining producing minimum resistance from stem to stern.

45. An engine driven marine vessel as claimed in claim 1, in which the main bearing of the rotor is substantially in the plane of the hull wall.

46. An engine driven marine vessel as claimed in claim 1, embodying a rotor having an axially disposed shaft, a cover plate for the opening in the hull wall, a plurality of blades having blade gears operatively disposed in said rotor, actuating gear means in operative engagement with said rotor and blade gears mounted on said cover plate, and timing and control means operatively connected to said blade gear means and mounted inboard the end of said rotor shaft, whereby the alignment of said blades may be determined and said blades may be caused to rotate on their own axes while revolving in an orbit about the axis of the propeller, said timing and control means being thereby accessible from within the hull.

47. An engine driven marine vessel as claimed in claim 1, in which the rotor is pendently mounted.

48. An engine driven marine vessel as claimed in claim 1, in which the rotor member is axially suspended from the housing.

49. An engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, a rotor operatively mounted in said housing, means carried by said rotor which keeps the water out of the said housing during operation whereby said rotor in operation has hydrostatic pressure on its outboard side only; and a plurality of propeller blades mounted in said rotor.

50. An engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, a rotor operatively mounted in said housing, water discharging vanes mounted on said rotor, said vanes ejecting the water from said housing during operation; and a plurality of propeller blades mounted in said rotor.

51. An engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, said housing having that portion thereof adjacent to the hull opening flaring toward the outboard side, a rotor operatively mounted in said housing, discharging vanes mounted on said rotor which vanes together and in cooperation with said flaring portion of the housing ejects the water from said housing whereby said rotor in operation has hydrostatic pressure on its outboard side only; and a plurality of propeller blades mounted in said rotor.

52. An engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, said housing having that portion thereof adjacent to the hull opening flaring toward the outboard side, a rotor operatively mounted in said housing, discharging vanes mounted on said rotor which vanes together and in cooperation with said flaring portion of the housing ejects the water from said housing whereby said rotor in operation has hydrostatic pressure on its outboard side only, said rotor having a web member, an axially disposed mounting shaft and peripherally disposed blade mounting housings in said web, a plurality of blades operatively disposed in said rotor, and actuating means for said rotor and blades, said rotor and blades being removable as a unit from the opening in the hull.

53. An engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, said propeller housing having a transversely disposed wall forming thereby two independent chambers, one disposed above the other, a rotor having a web member, in which are peripherally disposed blade mounting housings and an axially disposed mounting shaft surmounted by a driving gear, the said web and blade mounting housings being located in said lower chamber and said driving gear being located in the upper chamber, said chambers being water insulated one from the other, a plurality of blades operatively disposed in said rotor, and timing and control means in operative engagement with said blades.

54. In an engine driven marine vessel embodying a hull having an opening and a propeller, of the type having blades which rotate on their own axes while revolving in an orbit about a common axis, operatively mounted therein, said propeller having a housing which constitutes a continuation of the hull and forms a permanent closure for said opening in the hull wall to prevent water from entering the interior of the hull irrespective of the hull waterline, said propeller housing having a transversely disposed wall forming thereby two independent chambers, one disposed above the other, a rotor disposed in said housing, planetary gears mounted inside the upper chamber, a plurality of blades having blade gears operatively disposed in the lower chamber of said rotor, a master gear engaging said blade gears, said master gear having an axially disposed mounting shaft, and a gear mounted on the top of said shaft which gear meshes with said plentary gear, and a timing and control means in operative engagement with said plentary gears.

55. In combination with an engine driven marine vessel as claimed in claim 54, a timing and control shaft axially disposed in said propeller having a gear meshing with said planetary gears, and a holding means for said control shaft.

In witness whereof, I hereunto subscribe my name this fifth day of April, A. D. 1924.

KURT F. J. KIRSTEN.